(12) United States Patent
Batra et al.

(10) Patent No.: US 11,679,773 B2
(45) Date of Patent: Jun. 20, 2023

(54) AUGMENTING TRANSPORT SERVICES USING REAL-TIME EVENT DETECTION

(71) Applicant: ANI TECHNOLOGIES PRIVATE LIMITED, Bengaluru (IN)

(72) Inventors: Ayush Batra, Bangalore (IN); Dewwrat, Bangalore (IN); Sourit Manna, Bangalore (IN); Ritwik Saikia, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 228 days.

(21) Appl. No.: 17/139,957

(22) Filed: Dec. 31, 2020

(65) Prior Publication Data

US 2022/0126840 A1 Apr. 28, 2022

(30) Foreign Application Priority Data

Oct. 23, 2020 (IN) .............................. 202041046254

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *G06N 20/00* (2019.01);
(Continued)

(58) Field of Classification Search
None
See application file for complete search history.

(56) References Cited

U.S. PATENT DOCUMENTS 8,854,199 B2 * 10/2014 Cook ...................... G07C 5/00
 701/1
11,360,447 B2 * 6/2022 Park ...................... G06N 5/043
(Continued)

FOREIGN PATENT DOCUMENTS

EP 2469477 A1 10/2013
WO 2015160900 A1 10/2015

OTHER PUBLICATIONS

Khaled Saleh, Mohammed Hossny, Saeid Nahavandi, Driving behavior classification based on sensor data fusion using LSTM recurrent neural networks, IEEE 20th International Conference on Intelligent Transportation Systems, Oct. 2017, DOI: 10.1109/ITSC.2017.8317835.

(Continued)

*Primary Examiner* — Fekadeselassie Girma
(74) *Attorney, Agent, or Firm* — Chip Law Group

(57) ABSTRACT

A method for augmenting transport services using event detection is provided. The method includes collection of first sensor data generated by various sensors associated with a plurality of vehicles. The first sensor data includes sensor outputs that indicate a plurality of rash driving events. The sensor outputs are augmented based on angular rotation to obtain augmented sensor outputs. A prediction model is trained based on the augmented sensor outputs. Target sensor data associated with a target vehicle is provided as input to the trained prediction model, and based on an output of the trained prediction model an occurrence of a rash driving event is detected in real-time or near real-time. Based on a count of rash driving events associated with the target driver within a cumulative driving distance, a driver score of the target driver is determined.

19 Claims, 13 Drawing Sheets

(51) Int. Cl.
  *G06N 20/00* (2019.01)
  *B60W 40/08* (2012.01)
(52) U.S. Cl.
  CPC .............. *B60W 2040/0863* (2013.01); *B60W 2420/905* (2013.01); *B60W 2422/95* (2013.01); *B60W 2520/18* (2013.01); *B60W 2540/30* (2013.01)

(56) References Cited

U.S. PATENT DOCUMENTS

| | | | | |
|---|---|---|---|---|
| 11,360,959 | B2* | 6/2022 | Pourmohammad | G08B 19/00 |
| 11,403,938 | B2* | 8/2022 | Lewis | G06N 20/00 |
| 11,407,428 | B2* | 8/2022 | Salles | H04L 67/104 |
| 11,451,043 | B1* | 9/2022 | Olander | G01R 19/2513 |
| 11,463,841 | B1* | 10/2022 | Romano | H04W 4/029 |
| 2002/0019703 | A1* | 2/2002 | Levine | B60Q 1/346 |
| | | | | 340/439 |
| 2002/0179047 | A1* | 12/2002 | Hoang | B60K 6/485 |
| | | | | 903/945 |
| 2015/0081404 | A1* | 3/2015 | Basir | G06Q 30/08 |
| | | | | 705/14.1 |
| 2017/0053555 | A1* | 2/2017 | Angel | G07C 5/0808 |
| 2019/0012910 | A1* | 1/2019 | Kuffner, Jr. | G08G 1/166 |
| 2019/0066535 | A1* | 2/2019 | Pifko | G09B 19/167 |
| 2019/0102840 | A1* | 4/2019 | Perl | G06Q 40/08 |
| 2019/0111934 | A1* | 4/2019 | Shin | B60W 40/08 |
| 2019/0164451 | A1* | 5/2019 | Gaither | H04W 4/70 |
| 2020/0074326 | A1* | 3/2020 | Balakrishnan | G06F 16/583 |
| 2021/0114583 | A1* | 4/2021 | Flores | G01C 21/26 |

OTHER PUBLICATIONS

Jun Zhang, Zhongcheng Wu, Fang Li, Chengjun Xie, Tingting Ren, and Jie Chen, Liu Liu, A Deep Learning Framework for Driving Behavior Identification on In-Vehicle CAN-BUS Sensor Data, Mar. 2019, DOI: 10.3390/S19061356.

E.Heyns, S Uniyal, E.Dugundji, F.Tillema, C.Huijboom, Predicting Traffic Phases from Car Sensor Data using Machine Learning, Procedia Computer Science, vol. 151, 2019, pp. 92-99.

Shashanka Chigurupati, Sowmya Polavarapu, Yasesvi Kancheria, A. Kousar Nikhath, Integrated Computing System for Measuring Driver Safety Index, International Journal of Emerging Technology and Advanced Engineering, ISSN 2250-2459, vol. 2, Issue 6, Jun. 2012.

https://www.geotab.com/blog/detecting-dangerous-driving-patterns/.

* cited by examiner

AUGMENTING TRANSPORT SERVICES USING REAL-TIME EVENT DETECTION

CROSS-RELATED APPLICATIONS

This application claims priority of Indian Non-Provisional Application No. 202041046254, filed Oct. 23, 2020, the contents of which are incorporated herein by reference.

FIELD

Various embodiments of the disclosure relate generally to transport services. More specifically, various embodiments of the disclosure relate to methods and systems for augmenting transport services using event detection.

BACKGROUND

With proliferation of the Internet, on-demand transport services have become increasingly popular. As a result, individuals often rely on these on-demand transport services to fulfill their travelling needs. These services not only cater to the travelling needs of individuals but also allow individuals to participate in the role of drivers as well. For example, many transport services enable individuals serving as drivers to provide transport for other individuals and deliver packages, goods, prepared foods, or the like.

Typically, driving styles of drivers have a great impact on the health of vehicles they drive and the overall travel experience of passengers. For example, congenial driving style of a driver may lead to safe and satisfactory travelling experience for passengers and assure longevity of the corresponding vehicle. However, many a times drivers incorporate substandard driving styles. For example, an aggressive driver may frequently exhibit rash driving style such as harsh braking, harsh acceleration, harsh corning, or the like. Such rash driving styles lead to a poor travel experience for the passengers and may even lead to accidents, hence putting the life of the passengers at jeopardy. Further, such rash driving styles often damage the vehicles, leading to increased repair and maintenance cost for the vehicles and reduced lifespan of the vehicles, which is undesirable.

Thus, there exists a need for monitoring and analyzing the driving styles of the drivers for averting the above-mentioned problems. A known approach for monitoring and analyzing the driving styles of the drivers involves periodic inspection of the health of the vehicles and obtaining regular feedback from the passengers on their travel experience. However, periodic inspection and feedback collection are typically performed after the termination of a ride, and hence, fail to provide passenger satisfaction during their travel and avert catastrophic incidents, for example, accidents, in real time or near real-time basis.

In the light of the foregoing, there exists a need for a technical and reliable solution that overcomes the above-mentioned problems, and ensures efficient monitoring and analyzing of driving styles of drivers on a real-time or near real-time basis.

SUMMARY

Methods and systems for augmenting transport services using event detection are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
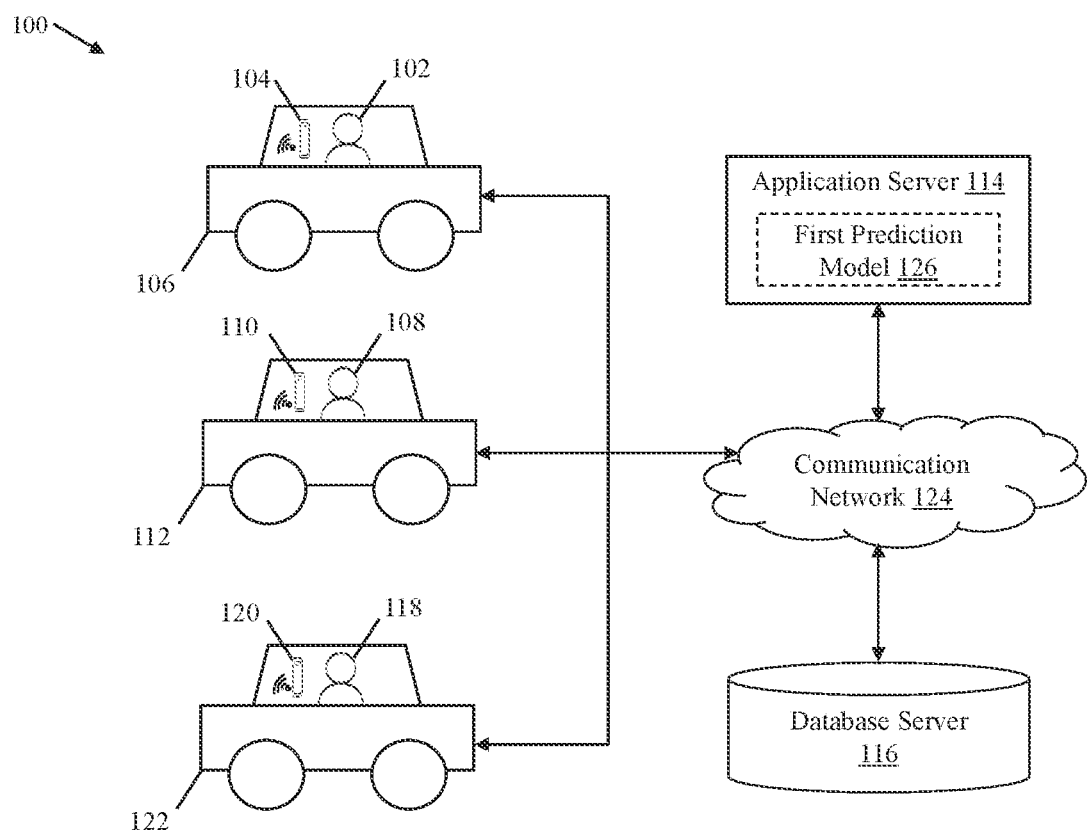
FIG. 1 is a block diagram that illustrates an exemplary environment for augmenting transport services using event detection, in accordance with an exemplary embodiment of the disclosure.

Certain embodiments of the disclosure may be found in disclosed systems and methods for augmenting transport services using event detection. Exemplary aspects of the disclosure provide methods and systems for augmenting the transport services using event detection and driver profiling. The methods and systems include various operations that are executed by a server (for example, an application server) to augment the transport services using event detection and driver profiling. In an embodiment, the server may be configured to collect first sensor data from a plurality of sensors associated with a plurality of vehicles. The first sensor data includes a first plurality of sensor outputs that indicate a plurality of rash driving events. The server may be configured to augment the first plurality of sensor outputs based on angular rotation to obtain a plurality of augmented sensor outputs. The server may be configured to train a prediction model based on the plurality of augmented sensor outputs. The server may be configured to receive, in real-time or near real-time, target sensor data from one or more sensors associated with a target vehicle driven by a target driver. The target sensor data includes a second plurality of sensor outputs that indicate a first driving pattern of the target driver at a first time-instance. The server may be configured to provide the target sensor data to the trained prediction model as an input. In an embodiment, the one or more sensors may be included in a mobile device that is present inside the target vehicle while the target vehicle is driven by the target driver. In such an embodiment, the server may provide the target sensor data to the trained prediction model only when the mobile device is detected to be stable. Based on an output of the trained prediction model for the inputted target sensor data, the server may be configured to detect an occurrence of at least one of the plurality of rash driving events at the first time-instance. The server may be further configured to determine a driver score for the target driver based on the detected rash driving event at the first time-instance and one or more rash driving events associated with the target driver in the past. The server may be further configured to categorize a driving style of the target driver in one of a plurality of driving style categories based on the determined driver score of the target driver. The server may be further configured to communicate an alert notification to the communication device of the target driver when the driver score of the target driver is below a threshold driver score.

The method and systems of the disclosure provide a technical solution that detects real-time rash driving events for vehicles, without requiring the vehicles to be equipped with additional or specialized hardware. Further, based on the rash driving event detection, drivers are categorized and real time alerts and warnings are communicated to the drivers. Such real time alerts and warnings enable reshaping of substandard driving styles to optimal driving styles. Thus, the methods and systems of the present disclosure are not only capable of detecting rash driving events but also correcting substandard driving styles of drivers on real-time or near real-time basis.

FIG. 1 a block diagram that illustrates an exemplary environment 100 for augmenting transport services using event detection, in accordance with an embodiment of the present disclosure. The exemplary environment 100 includes a first driver 102, a first communication device 104, a first vehicle 106 driven by the first driver 102, a second driver 108, a second communication device 110, and a second vehicle 112 driven by the second driver 108. The exemplary environment 100 further includes an application server 114 and a database server 116. The exemplary environment 100 further includes a target driver 118, a third communication device 120, and a target vehicle 122 being driven by the target driver 118. The first through third communication devices 104, 110, and 120, the application server 114, and the database server 116 may communicate with each other by way of a communication network 124 or through separate communication channels therebetween. In an embodiment, the first and second vehicles 106 and 112 and the target vehicle 122 may be coupled to the communication network 124 via one of telematics devices, on-board diagnostics devices (OBD), the first through third communication devices 104, 110, and 120, or a connected car network handled by a third-party server. For the sake of brevity, the system environment 100 is shown to include only three vehicles (i.e., the first vehicle 106, the second vehicle 112, and the target vehicle 122). However, in actual implementation, the exemplary environment 100 may include multiple vehicles of different makes, models, age, or the like, without deviating from the scope of the disclosure.

The first communication device 104 may be a computing device that is present within (or inside) the first vehicle 106, while the first vehicle 106 is being driven by the first driver 102. The first communication device 104 may include suitable logic, circuitry, interfaces, sensors, and/or code, executable by the circuitry to perform one or more data collection and communication operations. Examples of the first communication device 104 may include, but are not limited to, a mobile phone, a smartphone, a tablet, a phablet, a laptop, a computer, a telematics device, an OBD device, a multi-tainment system, and a vehicle head unit. In an embodiment, the first communication device 104 may be communicatively coupled to a plurality of sensors of the first vehicle 106 for obtaining sensor data generated by the plurality of sensors with regards to the motion of the first vehicle 106. In another embodiment, the first communication device 104 may include various sensors that generate sensor data. Since the first communication device 104 is within the first vehicle 106, the sensor data generated by the sensors of the first communication device 104 is indicative of the motion of the first vehicle 106. The first communication device 104 may be further configured to communicate the sensor data to the application server 114. In one embodiment, the first communication device 104 may be configured to run a service application hosted by the application server 114, such that the service application serves as a communication gateway between the application server 114 and the first communication device 104. The first communication device 104 may be a stationary device that is affixed to the first vehicle 106 or a mobile device.

Figure 2:
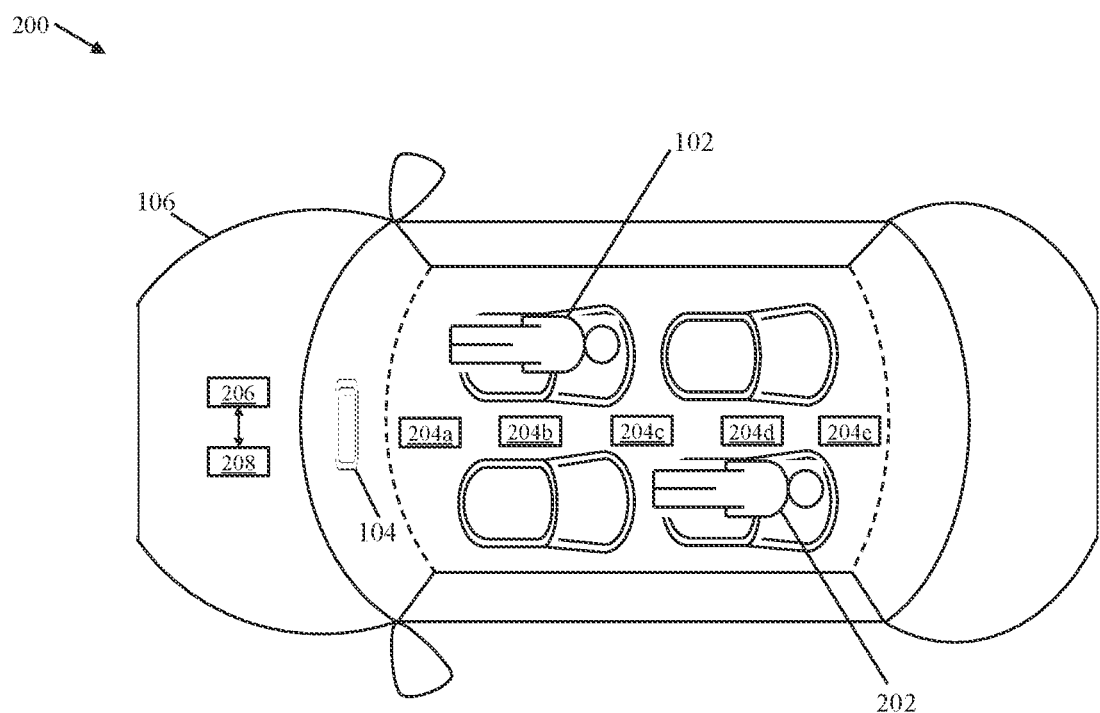
FIG. 2 is a block diagram that illustrates a vehicle of FIG. 1, in accordance with an exemplary embodiment of the disclosure.

The first vehicle 106 may be a mode of transport and may include suitable logic, circuitry, interfaces and/or code, executable by the circuitry, that may be configured to control and perform one or more operations with driving assistance from the first driver 102. In an embodiment, the first vehicle 106 may be deployed by a transport service provider (e.g., a cab service provider) to cater to travelling requirements of various passengers. In another embodiment, the first vehicle 106 may be a personal vehicle of the first driver 102 or an individual who has hired or employed the first driver 102 for driving assistance. Examples of the first vehicle 106 may include, but are not limited to, an automobile, a bus, a car, an auto rickshaw, and a bike. In an embodiment, the first vehicle 106 may include the plurality of sensors (as shown in FIG. 2) that are configured to generate the sensor data pertaining to (or characterizing) the motion of the first vehicle 106. In one embodiment, the first vehicle 106 may be an electric vehicle.

The second communication device 110 may be a computing device that is present within or inside the second vehicle 112, while the second vehicle 112 is being driven by the second driver 108. Examples of the second communication device 110 may include, but are not limited to, a mobile phone, a smartphone, a tablet, a phablet, a laptop, a computer, a telematics device, an OBD device, a multi-tainment system, and a vehicle head unit. The second communication device 110 is functionally similar to the first communication device 104.

The second vehicle 112 is a mode of transport and may include suitable logic, circuitry, interfaces and/or code, executable by the circuitry, that may be configured to control and perform one or more operations with driving assistance from the second driver 108. Examples of the second vehicle 112 may include, but are not limited to, an automobile, a bus, a car, an auto rickshaw, and a bike. The second vehicle 112 is functionally similar to the first vehicle 106. In one embodiment, the second vehicle 112 may be an electric vehicle.

The application server 114 may include suitable logic, circuitry, interfaces, and/or code, executable by the circuitry, that may be configured to perform one or more operations for real-time event detection and driver profiling. The application server 114 may be configured to communicate with the first through third communication devices 104, 110, and 120, and the database server 116 via the communication network 124. Examples of the application server 114 may include a cloud-based server, a local server, a group of centralized servers, a group of distributed servers, or the like. In an embodiment, the application server 114 may be a standalone system as shown in FIG. 1 for real-time event detection and driver profiling. In another embodiment, the application server 114 may be implemented as a sub-system or component of a transport arrangement system. The application server 114 may be configured to operate in two phases (or modes) such as a training phase and an implementation phase.

During the training phase, the application server 114 may be configured to collect first sensor data generated by sensors associated with a plurality of vehicles (e.g., the first and second vehicles 106 and 112). The collected first sensor data may include a first plurality of sensor outputs that indicate a plurality of rash driving events. Examples of the rash driving events may include, but are not limited to, a harsh braking event, a harsh cornering event, a harsh acceleration event, a harsh bump event, a tailgating event, and an over-speeding event. In other words, the collected first sensor data is tagged for various rash driving events associated with the first and second vehicles 106 and 112. The application server 114 may be configured to augment the first plurality of sensor outputs based on angular rotation to obtain a plurality of augmented sensor outputs. The application server 114 may be further configured to train a first prediction model 126 based on the plurality of augmented sensor outputs for rash driving event detection. Examples of the first prediction model 126 may include but are not limited to, a Support Vector Machine (SVM), a Logistic Regression model, a Bayesian classifier, a Decision Tree Classifier, a Copula-based model, a K-Nearest Neighbors (KNN) Classifier, an Artificial Neural Network (ANN), a Deep Feed Forward network, a Deep Convolutional network, a Recurrent Neural network, a Long Short Term Memory (LSTM) network, or a Random Forest (RF) classifier. After the first prediction model 126 is trained, the application server 114 may operate in the implementation phase.

During the implementation phase, the application server 114 may be configured to receive, in real-time or near real-time, target sensor data (i.e., second sensor data) generated by sensors associated with the target vehicle 122. In an embodiment, the sensors that generate the target sensor data are a part of the target vehicle 122. In another embodiment, the sensors that generate the target sensor data are included in the third communication device 120 that is present within the target vehicle 122. Examples of the third communication device 120 may include, but are not limited to, a mobile phone, a smartphone, a tablet, a phablet, a laptop, a computer, a telematics device, an OBD device, a multi-tainment system, and a vehicle head unit. The target sensor data includes a second plurality of sensor outputs that indicate (or characterize) a motion of the target vehicle 122. The application server 114 may be configured to provide the received target sensor data as an input to the trained first prediction model 126. Based on the inputted target sensor data, the trained first prediction model 126 may generate an output to indicate a likelihood of the target vehicle 122 being associated with one of the plurality of rash driving events. Thus, based on the output of the trained first prediction model 126, the application server 114 may detect an occurrence of at least one of the plurality of rash driving events for the target vehicle 122. The application server 114 may be further configured to generate a driving-pattern profile of the target driver 118 based on the target sensor data aggregated or accumulated over a continuous time interval, e.g., a week, a month, or the like. The driving-pattern profile of the target driver 118 may quantify one or more driver characteristics of a driving pattern of the target driver 118. The application server 114 may further analyze a past driving behavior of the target driver 118 in conjunction with the recently detected rash driving event and generate a driver score for the target driver 118. In an embodiment, if the driver score of the target driver 118 is less than or equal to a threshold driver score, the application server 114 may communicate an alert notification to the third communication device 120 of the target driver 118. The application server 114 may be further configured to select one a plurality of outcomes (e.g., penalizing or incentivizing a driver) for the target driver 118 based on the determined driver score.

The database server 116 may include suitable logic, circuitry, interfaces, and/or code, executable by the circuitry, that may be configured to perform one or more operations for storing driver profiles of various drivers (e.g., the first and second drivers 102 and 108, and the target driver 118). A driver profile of a driver may be indicative of a past driving behavior of the driver and may include a count of rash driving events that have been detected for the driver, a driving-pattern profile of the driver as determined by the application server 114, and operational data of various vehicles that have been driven by the driver. In an embodiment, the driver profiles of the drivers may be stored in the database server 116 by the application server 114.

The application server 114 may be configured to update the driver profiles of the drivers based on sensor data associated with vehicles driven by these drivers. Examples of the database server 116 may include a cloud-based database, a local database, a distributed database, a database management system (DBMS), or the like. Although the application server 114 and the database server 116 are shown as standalone entities in FIG. 1, it will be apparent to a person of ordinary skill in the art that, in another embodiment, the functionalities of the database server 116v may be integrated with the application server 114, without deviating from the scope of the disclosure.

Examples of the communication network 124 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the first through third communication devices 104, 110, and 120, the database server 116, and the application server 114), in the exemplary environment 100 may be coupled to the communication network 124 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the sensors associated with the first and second vehicles 106 and 112 may generate sensor data based on one or more movement characteristics of the first and second vehicles 106 and 112. The first and second communication devices 104 and 110 may communicate the generated sensor data to the application server 114 over the communication network 124. The application server 114 may be configured to collect the received sensor data over a first time-interval. The sensor data collected by the application server 114 over the first time-interval may be referred to as "the first sensor data". The first sensor data may include the first plurality of sensor outputs that indicate the plurality of rash driving events experienced by the first and second vehicles 106 and 112 during the first time-interval. The application server 114 may be configured to augment the first plurality of sensor outputs based on angular rotation to obtain the plurality of augmented sensor outputs. The application server 114 may further train the first prediction model 126 based on the plurality of augmented sensor outputs for rash driving event detection. When the target vehicle 122 is traversing a route, the sensors associated with the target vehicle 122 may generate the target sensor data to characterize the movement (or motion) of the target vehicle 122. The third communication device 120 that is placed within the target vehicle 122 may communicate the generated target sensor data to the application server 114. The application server 114 may receive the target sensor data from the third communication device 120 over the communication network 124 and provide the received target sensor data as an input to the trained first prediction model 126. Based on the inputted target sensor data, the trained first prediction model 126 may generate an output to indicate a likelihood of the target vehicle 122 being associated with one of the plurality of rash driving events. Thus, based on the output of the trained first prediction model 126, the application server 114 may detect an occurrence of at least one of the plurality of rash driving events for the target vehicle 122. The application server 114 may further communicate an alert notification to the third communication device 120 of the target driver 118. Such real-time alert notifications upon detection of the rash driving events enable the application server 114 to incorporate re-enforcement learning principles for modeling the driving style and behavior of the target driver 118.

FIG. 2 is a block diagram 200 that illustrates the first vehicle 106, in accordance with an exemplary embodiment of the disclosure. As shown in FIG. 2, the first vehicle 106 is being driven by the first driver 102, while a passenger 202 is seated on a back seat of the first vehicle 106. In another example, the first driver 102 may be the sole occupant of the first vehicle 106. The first vehicle 106 includes the plurality of sensors that sense one or more characteristics of the motion of the first vehicle 106. The plurality of sensors may include an accelerometer 204a, a gyroscope 204b, a magnetometer 204c, an altimeter 204d, a gravity sensor 204e, or the like. It will be apparent to a person of ordinary skill in the art that the first vehicle 106 may include multiple other motion sensors that sense the characteristics of the motion of the first vehicle 106. Hereinafter, the plurality of sensors are referred to and designated as "the plurality of sensors 204". In one embodiment where the first vehicle 106 is an electric vehicle, the first vehicle 106 may further include one or more batteries 206 (hereinafter, referred to as "the batteries 206") to power the first vehicle 106 and a battery management system (BMS) 208.

The accelerometer 204a is a motion sensor that is configured to detect and measure acceleration of the first vehicle 106 and generate a sensor output (i.e., sensor data) based on the detection. The accelerometer 204a may be a three-axes accelerometer, thus, each sensor output generated by the accelerometer 204a includes three axes sensor values along first through third axes, respectively, for example, along X-axis, Y-axis, and Z-axis.

The gyroscope 204b is a motion sensor that is configured to detect and measure orientation and angular velocity of the first vehicle 106 and generate a sensor output (i.e., sensor data) based on the detection. The gyroscope 204b may be a three-axes gyroscope, thus, each sensor output generated by the gyroscope 204b includes three axes sensor values along the first through third axes, respectively, for example, along X-axis, Y-axis, and Z-axis.

The magnetometer 204c is a motion sensor that is configured to detect and measure the orientation of the first vehicle 106 relative to the Earth's magnetic north and generate a sensor output (i.e., sensor data) based on the detection. The magnetometer 204c may be a three-axes magnetometer, thus, each sensor output generated by the magnetometer 204c includes three axes sensor values along first through third axes, respectively, for example, along X-axis, Y-axis, and Z-axis.

The altimeter 204d is a motion sensor that is configured to detect and measure elevation or altitude of the first vehicle 106 and generate a sensor output (i.e., sensor data) based on the detection. The altimeter 204d may be a three-axes altimeter, thus, each sensor output generated by the altimeter 204d includes three axes sensor values along the first through third axes, respectively, for example, along X-axis, Y-axis, and Z-axis.

The gravity sensor 204e is a motion sensor that is configured to detect and measure an acceleration effect of the Earth's gravity on the first vehicle 106 and generate a sensor output (i.e., sensor data) based on the detection. The gravity sensor 204e may be a three-axes gravity sensor, thus, each sensor output generated by the gravity sensor 204e includes three axes sensor values along the first through third axes, respectively, for example, along X-axis, Y-axis, and Z-axis.

When the first vehicle 106 is in motion, the plurality of sensors 204 generate corresponding sensor outputs based on the characteristics of the motion. The characteristics of the motion may include, but are not limited to, velocity, acceleration, tilt, elevation, or the like. The plurality of sensors 204 may be further configured to communicate the generated sensor outputs to the first communication device 104.

Similarly, the second vehicle 112 and the target vehicle 122 are also associated with a corresponding plurality of sensors that are similar to the plurality of sensors 204. Although the plurality of sensors 204 are shown to be a part of the first vehicle 106, the scope of disclosure is not limited it. In another embodiment, the first communication device 104 may include the plurality of sensors 204 without deviating from the scope of the disclosure.

The batteries 206 are energy storage devices that may be configured to power or supply current to one or more components of the first vehicle 106 for the functioning of the first vehicle 106. The batteries 206 may get drained upon usage, and may require periodic charging for the functioning of the first vehicle 106. Examples of the batteries 206 may include, but are not limited to, a lead acid battery, a Nickel Cadmium (NiCd) battery, a Nickel Metal Hydride (NIMH) battery, a lithium ion battery, a zinc air battery, or the like. The batteries 206 may be managed by the BMS 208.

The BMS 208 may include suitable logic, circuitry, interfaces, and/or code, executable by the circuitry, that may be configured to perform one or more operations for monitoring and managing the batteries 206. The BMS 208 may be communicatively coupled to the batteries 206 via a wired connection (such as an auxiliary cable, ethernet, hardware controlled area network (CAN) bus, or the like) or a wireless connection. The BMS 208 may be configured to monitor a state of charge (i.e., a charge level) of the batteries 206. The BMS 208 may include one or more sensors that generate sensor data to indicate an amount of current being supplied by the batteries 206 for the functioning of the first vehicle 106. The BMS 208 may be further configured to communicate the generated sensor data to the first communication device 104. Examples of the BMS 208 may include application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the BMS 208 may be compatible with multiple operating systems.

Figure 3:
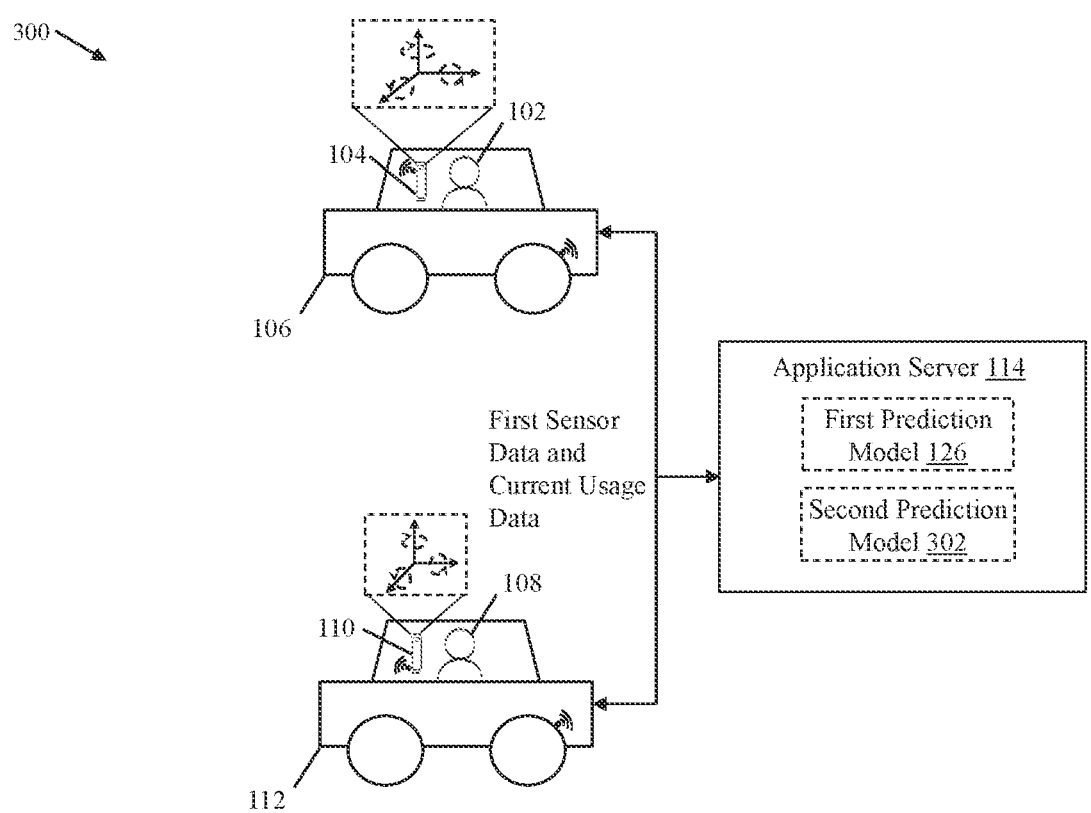
FIG. 3 is a schematic diagram that illustrates an exemplary scenario for training a prediction model for event detection, in accordance with an exemplary embodiment of the disclosure.

FIG. 3 is a schematic diagram that illustrates an exemplary scenario 300 for training the first prediction model 126 for event detection, in accordance with an exemplary embodiment of the disclosure. For the sake of brevity, training data has been shown to correspond to a sample size of two (i.e., two vehicles 106 and 112). However, in an actual implementation, the training data may correspond to a large sample size (e.g., a sample size of a thousand vehicles, ten thousand vehicles, or a million vehicles).

In the training phase, the first and second drivers 102 and 108 may be instructed, by the application server 114 via the respective first and second communication devices 104 and 110, to simulate the plurality of rash driving events using the respective first and second vehicles 106 and 112. Examples of the plurality of rash driving events may include, but are not limited to, a harsh braking event, a harsh cornering event, a harsh acceleration event, a harsh bump event, a tailgating event, and an over-speeding event. Further, the first and second communication devices 104 and 110 may be placed at a default angular position (or orientation along X-axis, Y-axis, and Z-axis) in the respective first and second vehicles 106 and 112. When the plurality of rash driving events are simulated using the first and second vehicles 106 and 112, the sensors in the first and second communication devices 104 and 110 generate sensor outputs (i.e., the first plurality of sensor outputs) indicating the plurality of rash driving events. For example, when a harsh braking event is simulated using the first vehicle 106, the sensors of the first communication device 104, that is present within the first vehicle 106, generate sensor outputs indicating the harsh braking event. Further, the sensor outputs that indicate the harsh braking event may be spread across multiple sequential timestamps. For example, if the simulation of harsh braking event is spanned across 5 seconds, the sensors generate sequential sensor outputs for 5 seconds that collectively indicate the harsh braking event. In an embodiment, each sensor output may include three axes sensor values along the first through third axis (i.e., X-axis, Y-axis, and Z-axis). For example, a first sensor output may be ($p_1$, $p_2$, $p_3$), where $p_1$, $p_2$, and $p_3$ correspond to sensor values along X-axis, Y-axis, and Z-axis, respectively. In another embodiment, when the plurality of rash driving events are simulated using the first and second vehicles 106 and 112, the sensors included in the first and second vehicles 106 and 112 generate the sensor outputs indicating the plurality of rash driving events. For example, when a harsh braking event is simulated using the first vehicle 106, the plurality of sensors 204 generate sensor outputs that indicate the harsh braking event. The sensor outputs (i.e., the first plurality of sensor outputs) generated by the sensors included in the first and second vehicles 106 and 112 are then communicated to the respective first and second communication devices 104 and 110. In an embodiment, each rash driving event may be simulated multiple times by the first and second drivers 102 and 108 on the respective first and second vehicles 106 and 112.

The first and second communication devices 104 and 110 communicate the sensor outputs to the application server 114. Thus, during the training phase, the application server 114 may be configured to receive and collect the first sensor data, including the first plurality of sensor outputs, from the first and second communication devices 104 and 110. In other words, the first sensor data includes acceleration data, gravity sensor data, gyroscopic data, altimeter data, and/or magnetometer data. The application server 114 may utilize the collected first sensor data for training the first prediction model 126. In other words, the first sensor data, that is labeled for the plurality of rash driving events, may serve as a training dataset (or corpus) for training the first prediction model 126.

After the collection of the first sensor data, the application server 114 may be configured to augment the first plurality of sensor outputs based on random angular rotation. For example, a sensor value (along any of the X-axis, Y-axis, and Z-axis) of a sensor output may be rotated in the range (−180 deg, 180 deg) based on clockwise or anticlockwise rotation. For augmenting the first plurality of sensor outputs, the application server 114 may be configured to generate an '$N \times 3$' 3-dimensional (3D) rotation matrix ($R_{(N \times 3)}$). The three columns of the 3D rotation matrix ($R_{(N \times 3)}$) correspond to the respective X-axis, Y-axis, and Z-axis, and each row of the 3D rotation matrix ($R_{(N \times 3)}$) corresponds to a random angular rotation along X-axis, Y-axis, and Z-axis. For generating the 3D rotation matrix ($R_{(N \times 3)}$), the application server 114 may be configured to randomly choose 'N' angular positions (e.g., three random positions $a_1$, $a_2$, and $a_3$) and determine values for angular rotations along X-axis, Y-axis, and Z-axis to achieve the randomly chosen angular positions. For example, for achieving the angular position $a_1$ from the default angular position, a sensor output might be required to be rotated 30 degrees clockwise along X-axis, 50 degrees anticlockwise along Y-axis, 0 degrees along Z-axis. Thus, the first row of the 3D rotation matrix ($R_{(N \times 3)}$) corresponding to the angular position $a_1$ may have values (30 deg, −50 deg, and 0 deg). Similarly, the application server 114 may determine the remaining rows of the 3D rotation matrix ($R_{(N \times 3)}$). The application server 114 may be further configured to apply the generated 3D rotation matrix ($R_{(N \times 3)}$) to each sensor output in the first sensor data to obtain the plurality of augmented sensor outputs. Thus, for each sensor output, 'N' augmented sensor outputs are obtained those indicate the same rash driving events as the corresponding sensor output indicated before augmentation. For example, if the first sensor output indicates the harsh acceleration event, the 'N' augmented sensor outputs obtained from the first sensor output also indicate the harsh acceleration event. In an embodiment, the three axis sensor values of a sensor output may be modified due to the angulation rotation by way of the 3D rotation matrix ($R_{(N \times 3)}$).

After the augmentation of the first plurality of sensor outputs, the application server 114 may be configured to train the first prediction model 126 using the plurality of augmented sensor outputs. The application server 114 may implement any suitable machine-learning techniques, statistical techniques, deep learning, or probabilistic techniques for training of the first prediction model 126. Based on the training, the first prediction model 126 learns an association between the augmented sensor outputs and the plurality of rash driving events. For example, the first prediction model 126 may learn, from the plurality of augmented sensor outputs, an acceleration range or pattern that corresponds to the harsh acceleration event. In another example, the first prediction model 126 may learn, from the plurality of augmented sensor outputs, a deacceleration range or pattern that corresponds to the harsh braking event. Beneficially, training the first prediction model 126 using the plurality of augmented sensor outputs generalizes the first prediction model 126. In other words, the first prediction model 126 is trained to be agnostic of any angular position associated with sensor outputs. Thus, a prediction accuracy of the trained first prediction model 126 is not impacted by variations in the placement or orientation of communication devices that include the sensors for generating sensor outputs.

After the first prediction model 126 is trained, the application server 114 may be configured to validate an accuracy level of the trained first prediction model 126. For validation, the application server 114 may provide a batch of sensor outputs as an input to the trained first prediction model 126. The batch of sensor outputs may be associated with a known rash driving event. Based on the inputted batch of sensor outputs, the first prediction model 126 may generate an output that indicates a likelihood of occurrence of the known rash driving event. The application server 114 may be configured to compare the output of the first prediction model 126 with an actual result and generate a validation output, i.e., the application server 114 may determine whether the first prediction model 126 has accurately predicted the occurrence of the known rash driving event. The validation output may be used as a feedback to improve the accuracy level of the first prediction model 126.

After the first prediction model 126 is trained, the application server 114 may execute the implementation phase. In the implementation phase, the application server 114 may utilize the first prediction model 126 to detect occurrences of one or more rash driving events based on real-time sensor data. The implementation phase has been described in detail in conjunction with FIGS. 4A and 4B. In another embodiment, the implementation phase may be executed in a separate system, device, or server. In such a scenario, the application server 126 may be configured to communicate the trained first prediction model 126 to the other server for executing the implementation phase.

In another embodiment, the first and second vehicles 106 and 112 may be electric vehicles. In such an embodiment, during the training phase when the first and second drivers 102 and 108 simulate the plurality of rash driving events using their respective first and second vehicles 106 and 112, BMSs of the first and second vehicles 106 and 112 may record sensor data indicating an amount of current being supplied by batteries of the first and second vehicles 106 and 112. For example, the sensors of the BMS 208 may generate sensor data that indicates the amount of current being supplied by the batteries 206 while the first driver 102 simulates the plurality of rash driving events on the first vehicle 106. The BMSs may further communicate the generated sensor data (i.e., recorded amount of current) to the respective first and second communication devices 104 and 110. The first and second communication devices 104 and 110 may further communicate the received sensor data to the application server 114. The application server 114 may be configured to collect the sensor data for the first time-interval. The collected sensor data pertaining to the amount of current being supplied by the batteries of the first and second vehicles 106 and 112 is indicative of a pattern of current usage associated with each of the plurality of rash driving events. The application server 114 may be configured to utilize the collected sensor data for training a second prediction model 302. In another embodiment, the application server 114 may utilize the collected sensor data for the further training of the first prediction model 126. For the sake of brevity, it is assumed that the application server 114 utilizes the collected sensor data to train the second prediction model 302. Examples of the second prediction model 302 may include but are not limited to, an SVM based model, a Logistic Regression model, a Bayesian classifier, a Decision Tree Classifier, a Copula-based model, a KNN Classifier, an ANN, a Deep Feed Forward network, a Deep Convolutional network, a Recurrent Neural network, an LSTM network, or an RF classifier.

The application server 114 may implement any suitable machine-learning techniques, statistical techniques, deep learning, or probabilistic techniques for training the second prediction model 302. Based on the training, the second prediction model 302 learns an association between the current usage pattern and the plurality of rash driving events. For example, the second prediction model 302 may learn, from the collected sensor data, a first current usage (or supply) pattern for the harsh acceleration event. In another example, the second prediction model 302 may learn, from the collected sensor data, a second current usage (or supply) pattern that corresponds to the harsh braking event. Beneficially, training the second prediction model 302 using the sensor data collected from a variety of batteries having different configuration, make, current supply capacity, or the like generalizes the second prediction model 302. In other words, the second prediction model 302 is trained to be agnostic of any battery type. Thus, a prediction accuracy of the trained second prediction model 302 is not impacted by variation in the types of batteries.

After the second prediction model 302 is trained, the application server 114 may be configured to validate an accuracy level of the trained second prediction model 302. For validation, the application server 114 may provide current usage (or supply) data of the batteries 206 as an input to the trained second prediction model 302. The current usage (or supply) data may be associated with a known rash driving event. Based on the inputted current usage (or supply) data, the second prediction model 302 may generate an output that indicates a likelihood of occurrence of the known rash driving event. The application server 114 may be configured to compare the output of the second prediction model 302 with an actual result and generate a validation output, i.e., the application server 114 may determine whether the second prediction model 302 has accurately predicted the occurrence of the known rash driving event. The validation output may be used as a feedback to improve the accuracy level of the second prediction model 302.

After the second prediction model 302 is trained, the application server 114 may execute the implementation phase. In the implementation phase, the application server 114 may utilize the second prediction model 302 along with the first prediction model 126 to detect occurrences of one or more rash driving events.

Figure 4A:
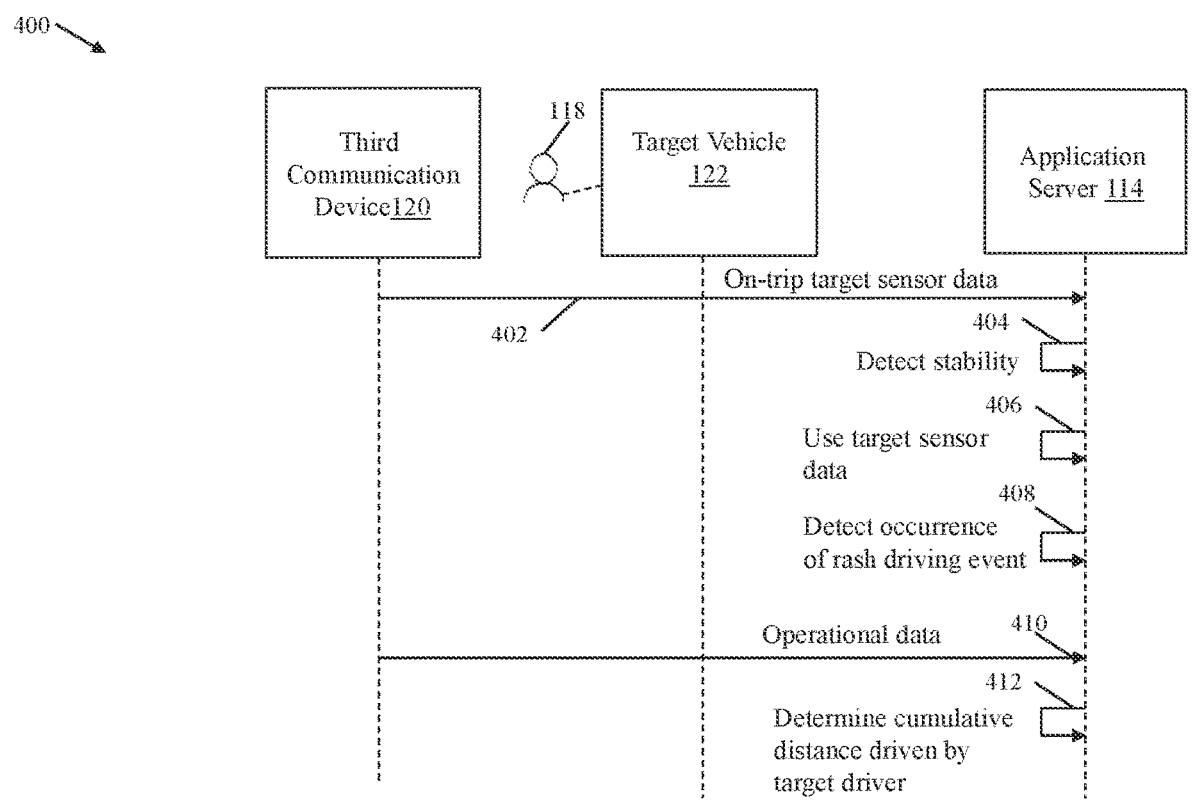
FIGS. 4A and 4B, collectively represent a process-flow diagram that illustrates an exemplary scenario for event detection and driver profiling in real-time or near real-time, in accordance with an exemplary embodiment of the disclosure.
Figure 4B:
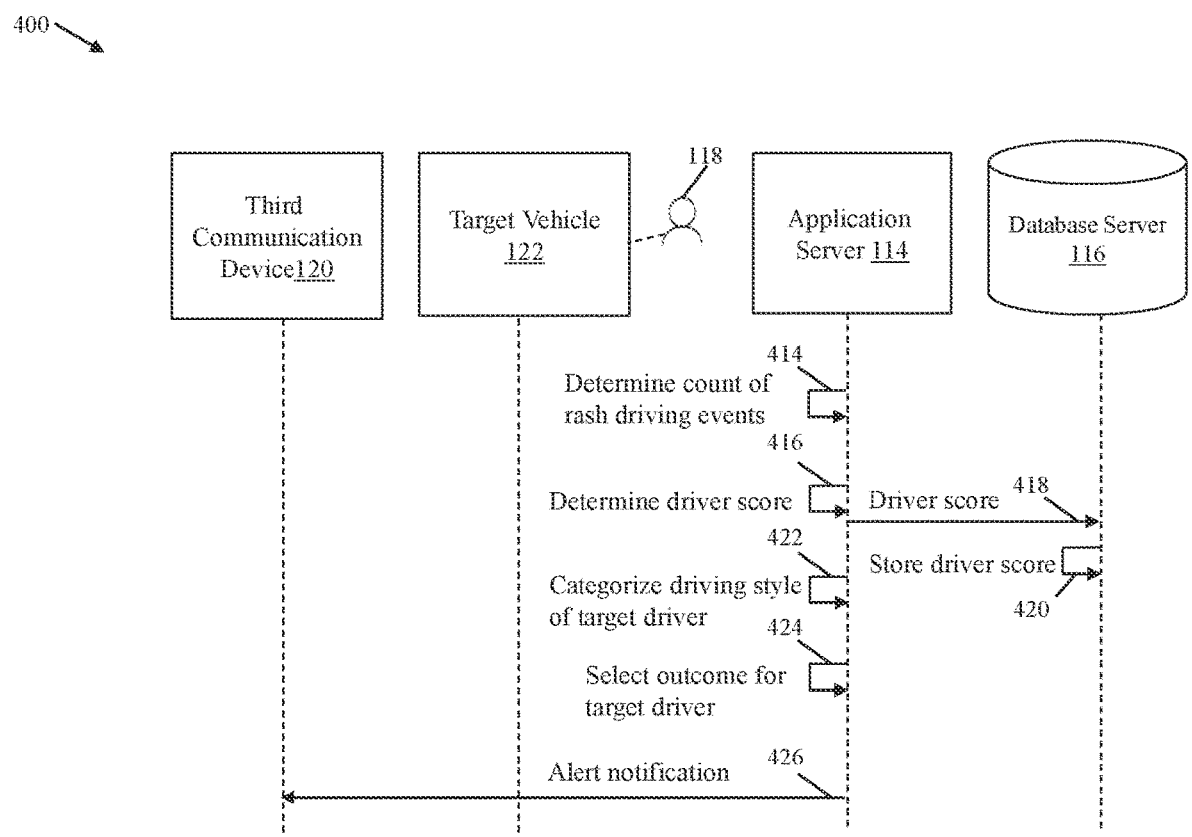

FIGS. 4A and 4B, collectively represent a process-flow diagram 400 that illustrates an exemplary scenario for event detection and driver profiling in real-time or near real-time, in accordance with an exemplary embodiment of the disclosure.

With reference to FIG. 4A, the target vehicle 122 may be driven by the target driver 118. While the target vehicle 122 is being driven by the target driver 118, the third communication device 120 may be present within the target vehicle 122. Since the third communication device 120 is present within a moving vehicle, the third communication device 120 also experiences the same motion as the target vehicle 122. Thus, the sensors (e.g., an accelerometer, a gyroscope, a magnetometer, an altimeter, and/or a gravity sensor) of the third communication device 120 may sense the motion and generate sensor outputs that characterize the motion of the target vehicle 122. In an embodiment, the third communication device 120 may be a stationary device that is affixed to the target vehicle 122. In such an embodiment, the third communication device 120 may only experience the motion of the target vehicle 122 and may not be subjected to any additional movement due to the handling of the third communication device 120. In another embodiment, the third communication device 120 may be a mobile device that is not affixed to the target vehicle 122. Thus, the third communication device 120 may be subjected to additional movements when the third communication device 120 is handled by the target driver 118 or any other occupant of the target vehicle 122. Thus, in such a scenario, the sensor outputs generated by the sensors of the third communication device 120 may characterize the motion of the target vehicle 122 as well as the additional movements of the third communication device 120. In an embodiment, the third communication device 120 may be configured to run the service application hosted by the application server 114. For example, the target vehicle 122 may be deployed by a transport aggregator offering an on-demand transport service. In such a scenario, the service application running on the third communication device 120 may correspond to a driver application for the on-demand transport service. The third communication device 120 may communicate real-time or near real-time target sensor data (i.e., the second sensor data) generated by the corresponding sensors to the application server 114 by way of the service application (as shown by arrow 402). The target sensor data includes the sensor outputs (i.e., the second plurality of sensor outputs) generated by the sensors of the third communication device 120 due to a motion experienced by the third communication device 120. The second plurality of sensor outputs indicate a driving pattern of the target driver 118 driving the target vehicle 122 at the current time-instance.

The application server 114 may be configured to receive the target sensor data communicated by the third communication device 120. Upon receiving the target sensor data, the application server 114 may be configured to detect whether the third communication device 120 from which the target sensor data is received is stable or unstable (as shown by arrow 404). For detecting whether the third communication device 120 is stable or unstable, the application server 114 may be configured to utilize the sensor outputs of the gyroscopic sensor or the gravity sensor in the received target sensor data.

In an exemplary scenario, a sensor output generated by the gyroscopic sensor at the current time-instance $t_1$ may include 3-axes sensor values G ($g_1$, $g_2$, $g_3$). The application server 114 may be configured to derive a first metric $M_1$ based on the sensor output G ($g_1$, $g_2$, $g_3$). In one example, the first metric $M_1$ may be derived based on the equation (1) as shown below:

$$M_1 = (g_1^2 + g_2^2 + g_3^2)^{0.5} \qquad (1)$$

When the derived first metric $M_1$ satisfies a first predefined condition, the application server 114 may detect that the third communication device 120 is stable. However, when the derived first metric $M_1$ does not satisfy the first predefined condition, the application server 114 may detect that the third communication device 120 is unstable. In an exemplary scenario, when the derived first metric $M_1$ is less than equal to a first value (i.e., $M_1 \leq n$), the application server 114 detects that the third communication device 120 is stable. However, when the derived first metric $M_1$ is greater than the first value (i.e., $M_1 > n$), the application server 114 detects that the third communication device 120 is unstable. The first value may be determined by the application server 114 based on historical gyroscopic sensor data collected from various stable and unstable communication devices.

In another exemplary scenario, a first sensor output generated by the gravity sensor at the current time-instance $t_1$ may be $GR_1$ ($gr_1$, $gr_2$, $gr_3$) and a second sensor output generated by the gravity sensor at a previous time instance may be $GR_2$ ($gr_5$, $gr_6$, $gr_7$). The application server 114 may be configured to derive a second metric $M_2$ based on the sensor outputs $GR_1$ ($gr_1$, $gr_2$, $gr_3$) and $GR_2$ ($gr_5$, $gr_6$, $gr_7$). In one example, the second metric $M_2$ may be derived based on the equation (2) as shown below:

$$M_2 = [(gr_1 - gr_5)^2 + (gr_2 - gr_6)^2 + (gr_3 - gr_7)^2]^{0.5} \qquad (2)$$

When the derived second metric $M_2$ satisfies a second predefined condition, the application server 114 may detect that the third communication device 120 is stable. However, when the derived second metric $M_2$ does not satisfy the second predefined condition, the application server 114 may detect that the third communication device 120 is unstable. In an exemplary scenario, when the derived second metric $M_2$ is less than equal to a second value (i.e., $M_2 \leq m$, the application server 114 detects that the third communication device 120 is stable. However, when the derived second metric $M_2$ is greater than the second value (i.e., $M_2 > m$), the application server 114 detects that the third communication device 120 is unstable. The second value may be determined by the application server 114 based on historical gravity sensor data collected from various stable and unstable communication devices.

At a time-instance, when the third communication device 120 is detected to be unstable, the application server 114 may be configured to discard the received target sensor data and wait for target sensor data of a subsequent time-instance. In a non-limiting example, it is assumed that the third communication device 120 is detected to be stable. Thus, the application server 114 may use the received target sensor data, and provide the received target sensor data as input to the trained first prediction model 126 (as shown by arrow 406).

Based on the inputted target sensor data, the trained first prediction model 126 may generate an output that indicates a likelihood of occurrence of each of the plurality of rash driving events. For example, the generated output may indicate that there is a 10% likelihood of harsh acceleration, an 80% likelihood of harsh braking, a 90% likelihood of harsh bump, or the like. Based on the output of the trained first prediction model 126, the application server 114 may be configured to detect whether any of the plurality of rash driving events has occurred at the current time-instance (as shown by arrow 408). If the likelihood of occurrence of a rash driving event as determined by the first prediction model 126 is greater than a threshold value, the application server 114 may detect that the corresponding rash driving event has occurred at the current time instance. In one example, the threshold value may be 50%. In this example, the application server 114 may detect the occurrence of harsh braking and harsh bump events at the current time instance. Thus, the application server 114 may tag or mark the current time-instance as a rash driving event for the target vehicle 122.

Beneficially, discarding the target sensor data for those time-instances when the third communication device 120 is detected to be unstable enables the application server 114 to ignore false positive rash driving events. For example, the third communication device 120 while being handled by the target driver 118 may fall and hit the surface of the target vehicle 122. If the target sensor data for such time instance is not discarded, it may lead to the detection of false positive harsh acceleration and harsh braking events.

In another embodiment, when the target vehicle 122 is an electric vehicle, the third communication device 120 may further receive real-time or near real-time sensor data generated by one or more sensors of a BMS of the target vehicle 122. The received sensor data includes battery current usage data (i.e., the amount of current being supplied by) of the batteries of the target vehicle 122. The third communication device 120 may communicate the real-time or near real-time sensor data to the application server 114 by way of the service application. The application server 114 may be configured to receive the sensor data communicated by the third communication device 120. Upon receiving the sensor data, the application server 114 may be configured to provide the received sensor data as input to the trained second prediction model 302. Based on the inputted sensor data, the trained second prediction model 302 may generate an output that indicates a likelihood of occurrence of each of the plurality of rash driving events. For example, the generated output may indicate that there is a 10% likelihood of harsh acceleration, an 80% likelihood of harsh braking, a 90% likelihood of harsh bump, or the like. Based on the output of the trained second prediction model 302, the application server 114 may be configured to detect whether any of the plurality of rash driving events has occurred at the current time-instance. If the likelihood of occurrence of a rash driving event as determined by the second prediction model 302 is greater than the threshold value, the application server 114 may detect that the corresponding rash driving event has occurred at the current time instance. In one example, the threshold value may be 50%. In this example, the application server 114 may detect the occurrence of harsh braking and harsh bump events at the current time instance. Thus, the application server 114 may tag or mark the current time-instance as a rash driving event for the target vehicle 122. In one embodiment, the application server 114 may utilize the outputs of the first prediction model 126 and the second prediction model 302 collectively to detect whether any of the plurality of rash driving events has occurred at the current time-instance. In other words, the application server 114 may detect that a rash driving event has occurred at the current time-instance when the outputs of both the first prediction model 126 and the second prediction model 302 indicate the occurrence of the rash driving event.

Upon the detection of the rash driving event, the application server 114 may be configured to obtain the operational data of the target vehicle 122 and one or more other vehicles that were driven by the target driver 118 in the past (as shown by arrow 410). The operational data of a vehicle for a driving tenure of a driver may include information pertaining to odometer readings associated with various trips of the vehicle, repair and maintenance information of the vehicle, vehicle age, vehicle make, historical passenger feedback for the driver driving the vehicle, or the like. In an embodiment, the application server 114 may obtain the operational data from the third communication device 120. For example, the third communication device 120 may be running the service application that maintains a log or track of various vehicles that have been driven by the target driver 118. In another embodiment, the application server 114 may obtain a driver profile of the target driver 118 from the database server 116 such that the driver profile includes the operational data of the target vehicle 122 and the other vehicles that have been driven by the target driver 118 in the past. In another embodiment, the application server 114 may obtain the driver profile of the target driver 118 from the corresponding memory.

Based on the operational data, the application server 114 may be configured to determine a cumulative distance for which the target vehicle 122 and the other vehicles have been driven by the target driver 118 till the current time-instance (as shown by arrow 412). For example, based on the different odometer readings of the target vehicle 122, the application server 114 may determine that till the current time instance the target vehicle 122 has been driven for 3,000 kilometers by the target driver 118. Similarly, the application server 114 may determine that the target driver 118 had driven another vehicle for 1,000 kilometers in the past. Thus, the cumulative distance for which the target vehicle 122 and the other vehicles have been driven by the target driver 118 is 4,000 kilometers.

With reference to FIG. 4B, the application server 114 may be further configured to determine a first value of a count of rash driving events per unit distance for the target driver 118, till the current time instance. For determining the first value, the application server 114 may determine a count of rash driving events associated with the target driver 118 (as shown by arrow 414). The count of rash driving events associated with the target driver 118 may be determined based on an aggregation of the detected rash driving event at the current time-instance and one or more rash driving events associated with the target driver 118 in the past. In one example, based on the driver profile of the target driver 118, the application server 114 may determine that the target driver 118 has been involved in '19' rash driving events in the past. These rash driving events may have been reported by various passengers travelling with the target driver 118 or detected based on the application server 114 using the trained first prediction model 126. Thus, the count of rash driving events associated with the target driver 118 is '20'. The application server 114 may then determine a ratio between the determined count of rash driving events and the determined cumulative distance for determining the first value for the target driver 118 (i.e., 20/4,000=1 rash driving event per 200 kilometers).

The application server 114 may be further configured to determine a driver score of the target driver 118 (as shown by arrow 416). The application server 114 may determine the driver score based on the determined first value (i.e., the count of rash driving events per unit distance) for the target driver 118. The driver score may be a numerical value, a percentage value, or a grade that quantifies a quality of the driving style and behavior of the target driver 118. In an example, the driver score may lie within a range [0,100] where a driver score of '100' represents the best driving style and behavior. For determining the driver score, the application server 114 may be configured to compare the determined first value for the target driver 118 with a baseline criterion. The baseline criterion may have been defined by a transport aggregator associated with the target vehicle 122 or may be determined by the application server 114 based on an analysis of a plurality of driver profiles of a plurality of drivers (e.g., the first and second drivers 102 and 108, or other drivers). For example, the baseline criterion may be an average count of rash driving events per unit distance of the plurality of drivers that have been characterized as good drivers based on historical passenger feedback. In one example, the baseline criterion may be one rash driving event per 300 kilometers. In the current example, the application server 114 may determine that the target driver 118 has been associated with one rash driving event per 200 kilometers. Based on the comparison, the application server 114 may determine a deviation of the first value from the baseline criterion. A high deviation from the baseline criterion may result in a low driver score, and vice versa. In one example, if the determined first value is same as (or better than) the baseline criterion, the application server 114 may determine the driver score to be 100, i.e., the highest driver score. With an increase in the deviation from the baseline criterion, the driver score may tend to decrease. In other words, if the count of rash driving events per unit distance of a driver is more than the baseline criterion, the driver score of the driver may be less than 100 depending upon the deviation. However, if the count of rash driving events per unit distance of a driver is less than the baseline criterion, the driver score of the driver may be 100. In a non-limiting example, the driver score of the target driver 118 as determined by the application server 114 may be '48'.

The application server 114 may be configured communicate the determined driver score to the database server 116 (as shown by arrow 418). The database server 116 may be configured to store the determined driver score in the driver profile of the target driver 118 (as shown by arrow 420). Based on the determination of the driver score of the target driver 118, the application server 114 may be configured to categorize the driving style and behavior of the target driver 118 in one of a plurality of driving style categories, e.g., a good driving style category and a bad driving style category (as shown by arrow 422). Each of the plurality of driving style categories may be associated with a driver score range. In an embodiment, the driver score range associated with each driving style category may be defined by the transport aggregator. In another embodiment, the driver score range associated with each driving style category may be determined by the application server 114. For example, the driver score range associated with the good driving style category may be '51-100' and the driver score range associated with the bad driving style category may be '0-50'. Thus, when the driver score of the target driver 118 is '48', the application server 114 may categorize the target driver 118 in the bad driving style category.

The application server 114 may be further configured to select one of a plurality of outcomes for the target driver 118 based on the determined driver score and the detection of the occurrence of rash driving event (as shown by arrow 424). The plurality of outcomes may include incentivizing the target driver 118 for a high driver score and penalizing the target driver 118 for a low driver score. The application server 114 may be further configured to communicate an alert notification to the third communication device 120 of the target driver 118 based on the detection of the occurrence of the rash driving event at the current time instance (as shown by arrow 426). In an embodiment, the application server 114 may communicate the alert notification when the determined driver score of the target driver 118 is below a threshold driving score, i.e., when the driving style and behavior of the target driver 118 is categorized as in the bad driving style category. In one example, the alert notification may be communicated via a push notification on the service application running on the third communication device 120. In another embodiment, the application server 114 may communicate the alert notification by way of an interactive voice response (IVR) call on the third communication device 120. Beneficially, the real-time alert notifications enable the application server 114 to re-shape the substandard driving style and behavior of the target driver 118 in real-time towards the optimal driving style and behavior.

In an embodiment, the application server 114 may be further configured to generate the driving-pattern profile of the target driver 118 based on the target sensor data aggregated over a period of time, e.g., one week, one month, or the like. In an example, the specific time-interval may start when the target driver 118 downloads and installs the service application hosted by the application server 114 on the third communication device 120. For example, the target sensor data that is received over multiple days may be aggregated to quantify one or more driver characteristics of the driving style and behavior of the target driver 118. The driving-pattern profile may include the one or more driver characteristics of the target driver 118. For example, the one or more driver characteristics may include a frequency of braking while driving, a braking pattern, a deacceleration pattern, an acceleration range of the target driver 118, frequently travelled routes, active and inactive hours during a day, or the like. The application server 114 may utilize the driving-pattern profile to identify if an imposter or an unauthorized driver is driving the target vehicle 122. For example, during a second time-interval, the application server 114 may receive third sensor data from the third communication device 120. The third sensor data may include sensor outputs that indicate a driving pattern in which the target vehicle 122 is being driven during the second time-interval. The application server 114 may compare the current driving pattern with the driving-pattern profile of the target driver 118. In a scenario where the current driving pattern is determined to be different from the driving-pattern profile of the target driver 118, the application server 114 identifies that the target vehicle 122 is being driven by another driver. Thus, the driving-pattern profile may serve as verification data for identity confirmation.

In another embodiment, the application server 114 may be configured to run the trained first prediction model 126 and the trained second prediction model 302 locally on the third communication device 120 (or other communication devices) by way of the service application installed on the third communication device 120. In such a scenario, when the third communication device 120 experiences limited or no-network connectivity issues, the service application may run in an offline mode for real-time event detection. In such a scenario, the first prediction model 126 and the second prediction model 302 that are locally run on the third communication device 120 detect the occurrence of one or more rash-driving events based on the second sensor data and the battery current usage data, respectively. In one embodiment, the application server 114 may be associated with a transportation service provider, such as a cab service company. In another embodiment, the application server 114 may be associated with a vehicle manufacturing company.

Figure 5:
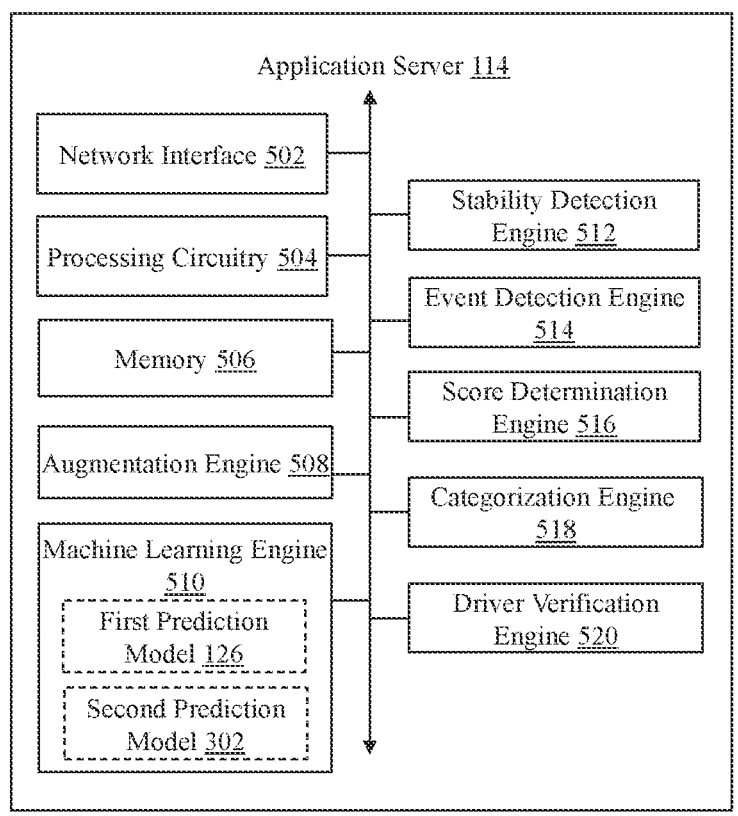
FIG. 5 is a block diagram that illustrates an application server of FIG. 1, in accordance with an exemplary embodiment of the disclosure.

FIG. 5 is a block diagram that illustrates the application server 114, in accordance with an embodiment of the present disclosure. FIG. 5 is described in conjunction with FIGS. 1-4B. The application server 114 may include a network interface 502, processing circuitry 504, a memory 506, an augmentation engine 508, a machine learning engine 510, the first prediction model 126, and the second prediction model 302. The application server 114 may further include a stability detection engine 512, an event detection engine 514, a score determination engine 516, a categorization engine 518, and a driver verification engine 520. The network interface 502, the processing circuitry 504, the memory 506, the augmentation engine 508, the machine learning engine 510, the stability detection engine 512, the event detection engine 514, the score determination engine 516, the categorization engine 518, and the driver verification engine 520 may communicate with each other by way of one or more communication buses.

The network interface 502 may include suitable logic, circuitry, interfaces, and/or code, executable by the circuitry that may be configured to enable the application server 114 to communicate with the first through third communication devices 104, 110, and 120, and the database server 116. The network interface 502 may be implemented as hardware, software, firmware, or a combination thereof. Examples of the network interface 502 may include a network interface card, a physical port, a network interface device, an antenna, a radio frequency transceiver, a wireless transceiver, an Ethernet port, a universal serial bus (USB) port, or the like.

The processing circuitry 504 may include suitable logic, circuitry, interfaces, and/or code, executable by the circuitry, that may be configured to perform various operations for real-time event detection and driver profiling. The processing circuitry 504 may be configured to perform various operations associated with data collection and data processing. The processing circuitry 504 may be configured to the control and execute the training phase and the implementation phase of the application server 114. The processing circuitry 504 may be implemented by one or more processors, such as, but are not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 504 may be compatible with multiple operating systems.

The memory 506 may include suitable logic, circuitry, and interfaces that may be configured to store one or more instructions which when executed by the processing circuitry 504 cause the processing circuitry 504 to perform various operations for data collection and data processing. The memory 506 may be configured to store the collected first sensor data, the second sensor data, and the third sensor data. In one embodiment, the memory 506 may be further configured to store various driver profiles of drivers (e.g., the first and second drivers 102 and 108, and the target driver 118). Examples of the memory 506 may include, but are not limited to, a random access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 506 in the application server 114, as described herein. In another embodiment, the memory 506 may be realized in form of the database server 116 or a cloud storage working in conjunction with the application server 114, without departing from the scope of the disclosure.

The augmentation engine 508 may include suitable logic, circuitry, interfaces, and/or code, executable by the circuitry, that may be configured to augment the collected first sensor data based on random angular rotation (as described in the foregoing description of FIG. 3). For augmenting the collected first sensor data, the augmentation engine 508 may be configured to generate the 3D rotation matrix ($R_{(N \times 3)}$) and apply the generated 3D rotation matrix ($R_{(N \times 3)}$) to each sensor output in the first sensor data to obtain the plurality of augmented sensor outputs. The augmentation engine 508 may be implemented by one or more processors, such as, but are not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the augmentation engine 508 may be compatible with multiple operating systems.

The machine learning engine 510 may include suitable logic, circuitry, interfaces, and/or code, executable by the circuitry, that may be configured to perform one or more operations for training the first prediction model 126 using the plurality of augmented sensor outputs and the second prediction model 302 using the battery current usage data. The machine learning engine 510 may implement any suitable machine-learning techniques, statistical techniques, deep learning, or probabilistic techniques for training of the first prediction model 126 and the second prediction model 302. The machine learning engine 510 may train the first prediction model 126 to correlate the plurality of rash driving events with the plurality of augmented sensor outputs. The machine learning engine 510 may train the second prediction model 302 to correlate the plurality of rash driving events with the battery current usage data. The machine learning engine 510 may be implemented by one or more processors, such as, but are not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the machine learning engine 510 may be compatible with multiple operating systems.

The stability detection engine 512 may include suitable logic, circuitry, interfaces, and/or code, executable by the circuitry, that may be configured to perform one or more operations for detecting whether the third communication device 120, from which the target sensor data (i.e., the second sensor data) is received, is stable or unstable. The stability detection engine 512 may be configured to utilize and process various sensor outputs generated by a gyroscope sensor or a gravity sensor for stability and instability detection (as described in the foregoing description of FIGS. 4A and 4B). The stability detection engine 512 may be configured to provide sensor data to the trained first prediction model 126 as input only when the sensor data is associated with a stable device. In other words, the stability detection engine 512 skips event detection at those time-instances when a communication device, from which sensor data is received, is detected to be unstable. The stability detection engine 512 may be implemented by one or more processors, such as, but are not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the stability detection engine 512 may be compatible with multiple operating systems.

The event detection engine 514 may include suitable logic, circuitry, interfaces, and/or code, executable by the circuitry, that may be configured to perform one or more operations for rash driving event detection. The event detection engine 514 may be configured to detect whether a rash driving event has occurred for the target vehicle 122 based on the output of the trained first prediction model 126 (as described in the foregoing description of FIGS. 4A and 4B). The event detection engine 514 may be implemented by one or more processors, such as, but are not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the event detection engine 514 may be compatible with multiple operating systems.

The score determination engine 516 may include suitable logic, circuitry, interfaces, and/or code, executable by the circuitry, that may be configured to perform one or more operations for determining driver score of drivers. The score determination engine 516 may be configured to determine the baseline criterion based on the analysis of the plurality of driver profiles of the plurality of drivers. The score determination engine 516 may be further configured to determine the first value for the target driver 118 based on the cumulative distance driven by the target driver 118 and the count of rash driving events associated with the target driver 118 (as described in the foregoing description of FIG. 4B). The score determination engine 516 may be implemented by one or more processors, such as, but are not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the score determination engine 516 may be compatible with multiple operating systems.

The categorization engine 518 may include suitable logic, circuitry, interfaces, and/or code, executable by the circuitry, that may be configured to categorize the driving style and behavior of the target driver 118 in one of the plurality of driving style categories based on the determined driver score of the target driver 118. Examples of the categorization engine 518 may include, but are not limited to, an ASIC processor, a RISC processor, a CISC processor, and an FPGA processor. The categorization engine 518 may also correspond to a CPU, a GPU, an NPU, a DSP, or the like. It will be apparent to a person of ordinary skill in the art that the categorization engine 518 may be compatible with multiple operating systems.

The driver verification engine 520 may include suitable logic, circuitry, interfaces, and/or code, executable by the circuitry, that may be configured to generate driving-pattern profiles of various drivers based on sensor data accumulated during driving trips of the corresponding drivers. The driver verification engine 520 may be further configured to determine whether an authorized driver (i.e., the target driver 118) is driving a vehicle (e.g., the target vehicle 122) by comparing the driver-pattern profile of the authorized driver with a current driving pattern associated with the vehicle. Examples of the driver verification engine 520 may include, but are not limited to, an ASIC processor, a RISC processor, a CISC processor, and an FPGA processor. The driver verification engine 520 may also correspond to a CPU, a GPU, an NPU, a DSP, or the like. It will be apparent to a person of ordinary skill in the art that the driver verification engine 520 may be compatible with multiple operating systems Although the processing circuitry 504, the augmentation engine 508, the machine learning engine 510, the stability detection engine 512, the event detection engine 514, the score determination engine 516, the categorization engine 518, and the driver verification engine 520 are shown as standalone components of the application server 114, the scope of the disclosure is not limited to it. In another embodiment, the processing circuitry 504 may be integrated with the functionalities of the augmentation engine 508, the machine learning engine 510, the stability detection engine 512, the event detection engine 514, the score determination engine 516, the categorization engine 518, and the driver verification engine 520.

Figure 6A:
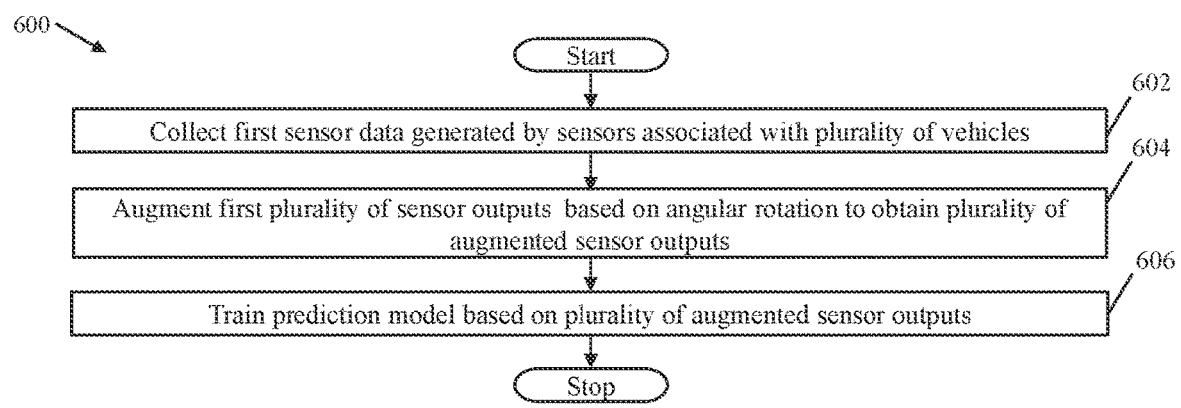
FIG. 6A is a flow chart that illustrates a method for training a prediction model for rash driving event detection, in accordance with an exemplary embodiment of the disclosure.

FIG. 6A is a flow chart 600 that illustrates a method for training the first prediction model 126 for real-time rash driving event detection, in accordance with an exemplary embodiment of the disclosure. The flow chart 600 represents the training phase of the application server 114 during which the first prediction model 126 is trained.

At 602, the first sensor data generated by various sensors associated with a plurality of vehicles (e.g., the first and second vehicles 106 and 112) is collected. The application server 114 may be configured to collect the first sensor data generated by the sensors associated with the first and second vehicles 106 and 112. The first sensor data may be received from the first and second communication devices 104 and 110 present within the respective first and second vehicles 106 and 112, via the communication network 124. The first sensor data may include the first plurality of sensor outputs (i.e. the acceleration data, the gravity sensor data, the gyroscopic data, the altimeter data, and/or the magnetometer data) that indicate the plurality of rash driving events.

At 604, the first plurality of sensor outputs are augmented based on angular rotation to obtain the plurality of augmented sensor outputs. The application server 114 may be configured to augment the first plurality of sensor outputs to obtain the plurality of augmented sensor outputs. The method of augmenting the first plurality of sensor outputs is described in conjunction with FIG. 6B.

Figure 6B:
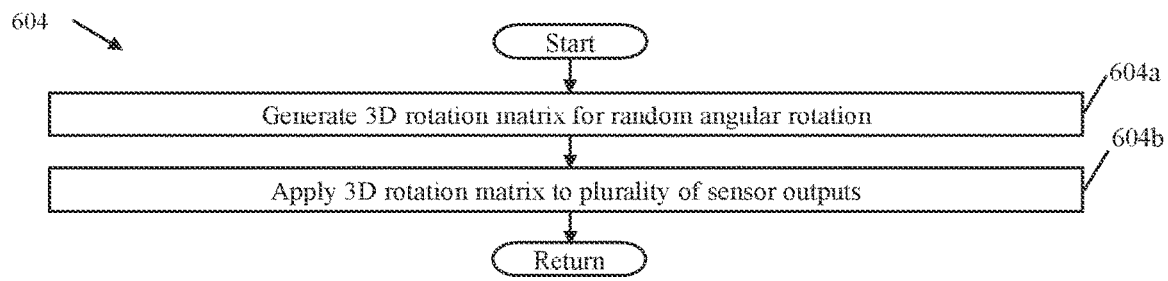
FIG. 6B is a sub flow chart that illustrates a method for augmenting a plurality of sensor outputs, in accordance with an exemplary embodiment of the disclosure.

Referring now to FIG. 6B, a sub flow chart 604 that illustrates the method for augmenting the first plurality of sensor outputs in accordance with an exemplary embodiment of the disclosure, is shown. At 604a, the 3D rotation matrix ($R_{(N \times 3)}$) for random angular rotation is generated. The application server 114 may be configured to generate the 3D rotation matrix ($R_{(N \times 3)}$). At 604b, the 3D rotation matric ($R_{(N \times 3)}$) is applied to the first plurality of sensor outputs. The application server 114 may be configured to apply the 3D rotation matric ($R_{(N \times 3)}$) to the first plurality of sensor outputs for the angular rotation of the first plurality of sensor outputs. The first plurality of sensor outputs after the angular rotation correspond to the plurality of augmented sensor outputs.

Referring back to FIG. 6A, at 606, the first prediction model 126 may be trained based on the plurality of augmented sensor outputs. The application server 114 may be configured to train the first prediction model 126 based on the plurality of augmented sensor outputs. The trained first prediction model 126 may be validated by the application server 114 for improving the accuracy level of the first prediction model 126.

Figure 7A:
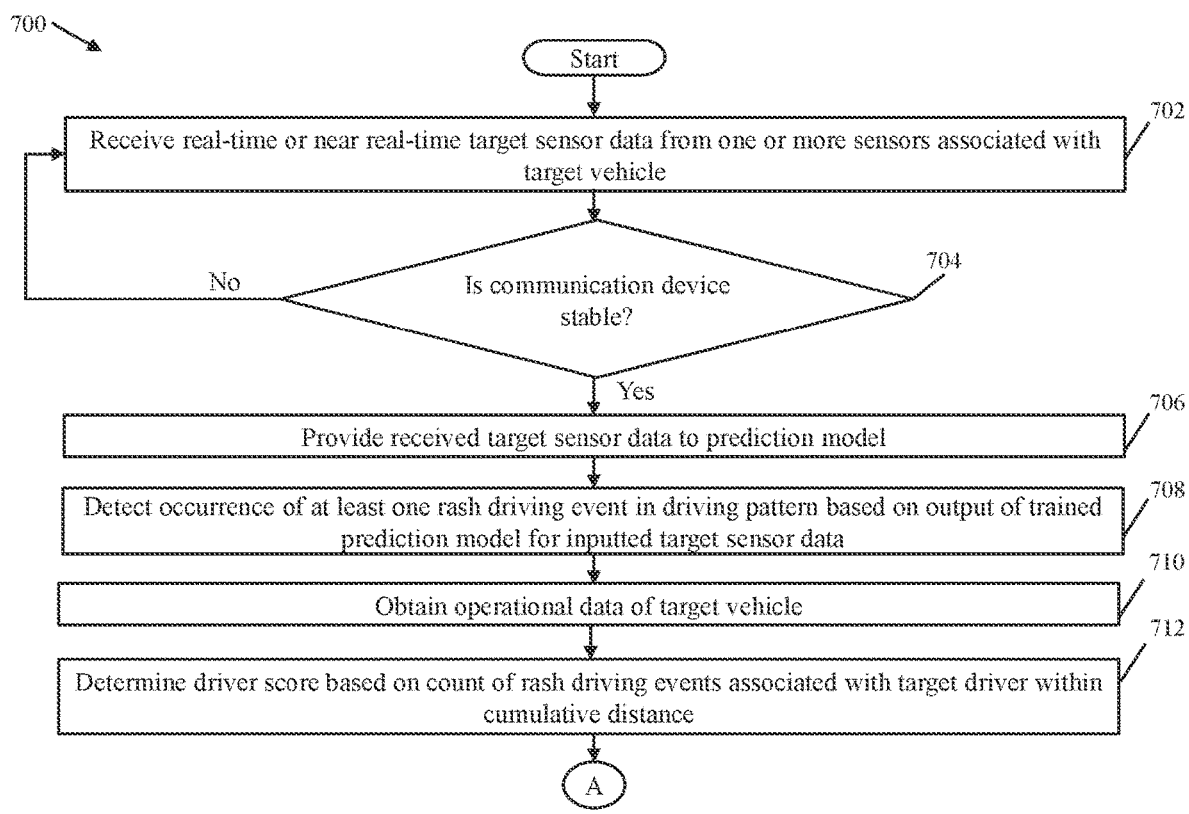
FIGS. 7A and 7B collectively, represent a flow chart that illustrates a method for augmenting transport services using real-time event detection, in accordance with an exemplary embodiment of the disclosure.
Figure 7B:
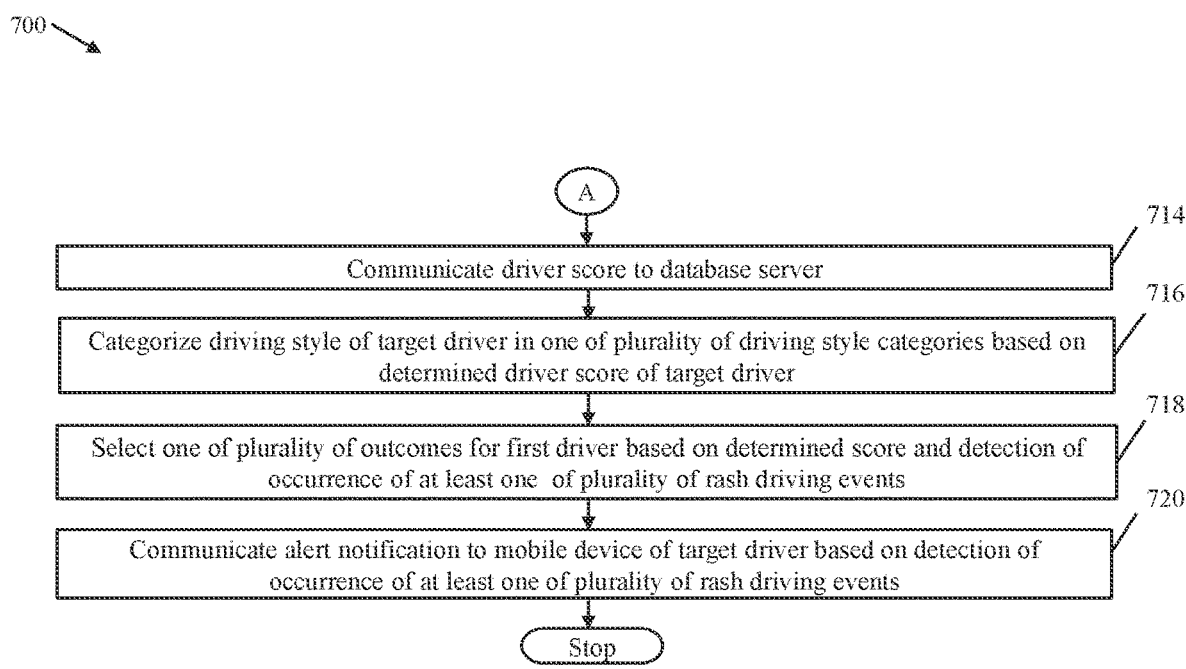

FIGS. 7A and 7B collectively, represent a flow chart 700 for augmenting transport services using real-time event detection, in accordance with an embodiment of the present disclosure.

At 702, real-time or near real-time target sensor data generated by sensors associated with the target vehicle 122 is received. The application server 114 may be configured to receive the target sensor data generated by the sensors associated with the target vehicle 122 in real-time or near real-time. The sensors associated with the target vehicle 122 may be included in the third communication device 120 that is present inside the target vehicle 122, while the target vehicle 122 is being driven by the target driver 118. The target sensor data may include the second plurality of sensor outputs that indicate the driving pattern of the target driver 118 driving the target vehicle 122 at the first time-instance. The second plurality of sensor outputs may correspond to a plurality of sequential time-instances. Each sensor output may have 3-axes sensor values. For example, a sensor output from a gyroscopic sensor may have a 3-axes value, G ($g_1$, $g_2$, $g_3$).

At 704, the application server 114 may be configured to detect whether the third communication device 120 is stable or unstable based on the received target sensor data (as described in the foregoing description of FIG. 4A). If at 704, the application server 114 detects that the third communication device 120 is unstable, the application server 114 discards the received target sensor data, and 702 is executed. If at 704, the application server 114 detects that the third communication device 120 is stable, 706 is executed.

At 706, the received target sensor data is provided as input to the trained first prediction model 126 based on the detection that the third communication device 120 is stable. The application server 114 may be configured to provide the received target sensor data as input to the trained first prediction model 126 when the third communication device 120 is detected to be stable. At 708, an occurrence of one of the plurality of rash driving events at the first time-instance is detected based on the output of the trained first prediction model 126 for the inputted target sensor data. The application server 114 may be configured to detect the occurrence of one of the plurality of rash driving events at the first time-instance based on the output of the trained first prediction model 126.

At 710, the operational data of the target vehicle 122 is obtained. The application server 114 may be configured to obtain the operational data of the target vehicle 122 and one or more other vehicles that were driven by the target driver 118 in the past. The operational data is indicative of the cumulative distance that the target vehicle 122 and the one or more other vehicles are driven by the target driver 118 until the first time-instance.

At 712, the driver score of the target driver 118 is determined based on the count of rash driving events associated with the target driver 118 within the cumulative distance. The application server 114 may be configured to determine the driver score of the target driver 118 based on the count of rash driving events associated with the target driver 118 within the cumulative distance.

At 714, the determined driver score is communicated to the database server 116. The application server 114 may be configured to communicate the determined driver score to the database server 116. As 716, the driving style and behavior of the target driver 118 is categorized in one of the plurality of driving style categories based on the determined driver score. The application server 114 may be configured to categorize the driving style and behavior of the target driver 118 in one of the plurality of driving style categories, e.g., the good driving style category and the bad driving style category. At 718, one of the plurality of outcomes for the target driver 118 is selected based on the determined driver score and the detection of the occurrence of rash driving event. The application server 114 may be configured to select one of the plurality of outcomes for the target driver 118 based on the determined driver score and the detection of the occurrence of rash driving event. The plurality of outcomes may include incentivizing the target driver 118 for a high driver score and penalizing the target driver 118 for a low driver score. At 720, an alert notification is communicated to the third communication device 120 of the target driver 118 based on the detection of the occurrence of the rash driving event at the current time instance. The application server 114 may be configured to communicate the alert notification to the third communication device 120 of the target driver 118 when the determined driver score of the target driver 118 is below a threshold driving score, i.e., when the driving style and behavior of the target driver 118 is categorized as in the bad driving style category.

Figure 8:
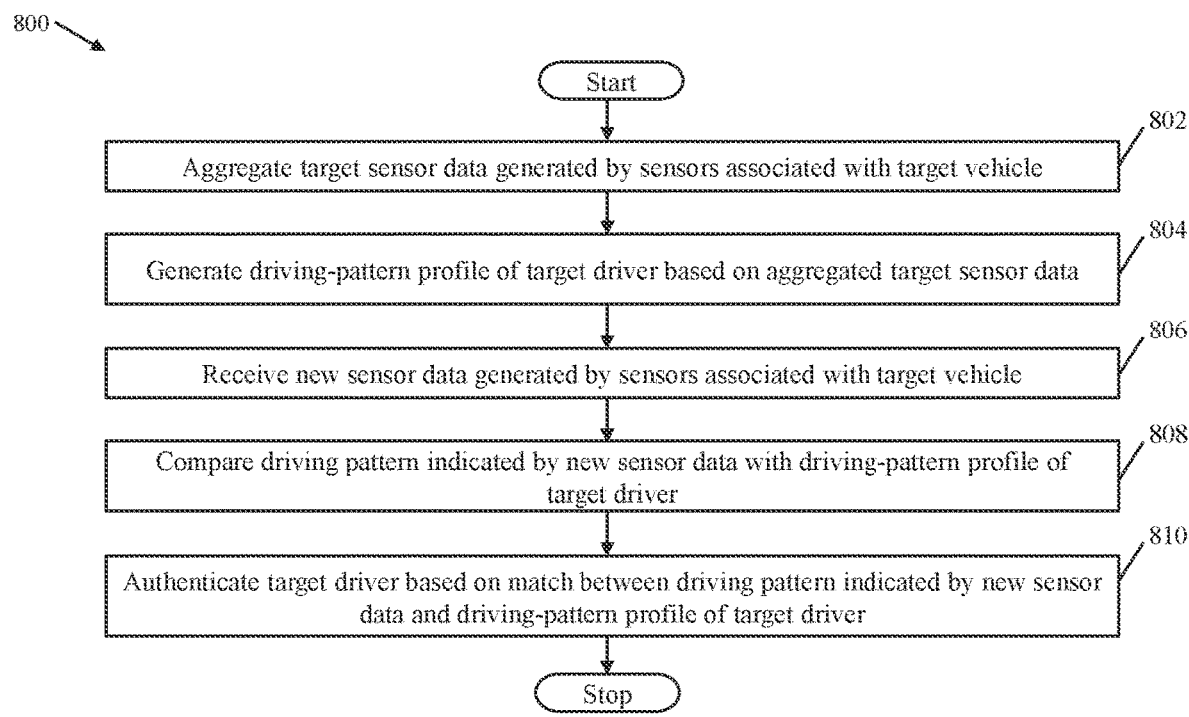
FIG. 8 is a flow chart that illustrates a method of authenticating a driver of a vehicle, in accordance with an embodiment of the present disclosure.

FIG. 8 represents a flow chart 800 that illustrates a method of authenticating a driver of a vehicle, in accordance with an embodiment of the present disclosure.

At 802, target sensor data generated by the sensors associated with the target vehicle 122 is aggregated over a period of time. The application server 114 may be further configured to aggregate the target sensor data generated by the third communication device 120 present in the target vehicle 122. At 804, the driving-pattern profile of the target driver 118 is generated based on the aggregated target sensor data. The application server 114 may be configured to generate the driving-pattern profile of the target driver 118. At 806, new sensor data, generated by the sensors associated with the target vehicle 122, is received. The application server 114 may be further configured to receive the new sensor data generated by the third communication device 120 when the target vehicle 122 is driven or when a trip on the target vehicle 122 is initiated.

At 808, the application server 114 may be configured to compare the driving pattern indicated by the new sensor data with the driving-pattern profile of the target driver 118. At 810, the application server 114 may be configured to authenticate the target driver 118 based on a match between the driving pattern indicated by the new sensor data and the driving-pattern profile of the target driver 118. In other words, based on the comparing of the driving pattern indicated by the new sensor data with the driving-pattern profile of the target driver 118, the application server 114 identifies whether the target vehicle 122 is being driven by the target driver 118 or another driver.

Figure 9:
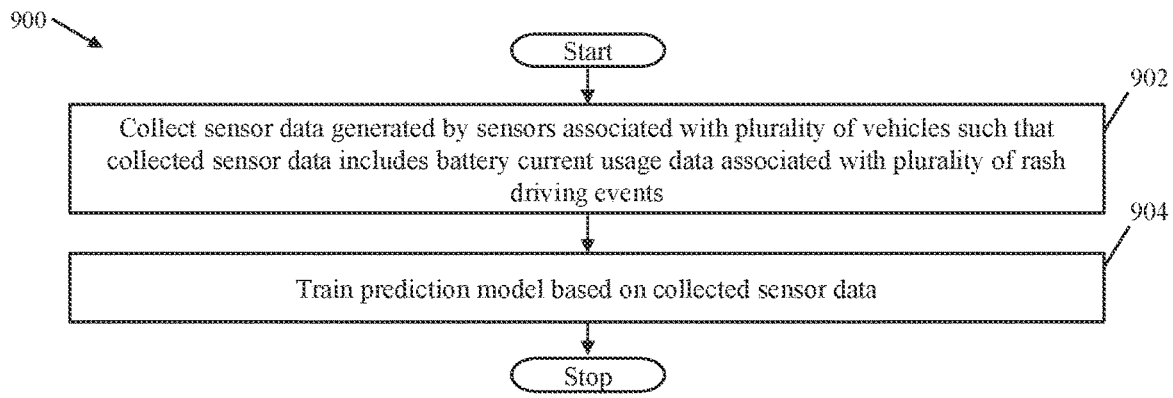
FIG. 9 is a flow chart that illustrates a method for training a prediction model for rash driving event detection, in accordance with an exemplary embodiment of the disclosure.

FIG. 9 is a flow chart 900 that illustrates a method for training the second prediction model 302 for real-time rash driving event detection, in accordance with an exemplary embodiment of the disclosure. The flow chart 900 represents the training phase of the application server 114 during which the second prediction model 302 is trained.

At 902, sensor data generated by various sensors associated with a plurality of vehicles (e.g., the first and second vehicles 106 and 112) is collected. The collected sensor data includes battery current usage data associated with the plurality of rash driving events. The sensor data may be collected by the application server 114 from the first and second communication devices 104 and 110 present within the respective first and second vehicles 106, via the communication network 124. The sensor data may be generated by the sensors associated with the BMSs of the first and second vehicles 106 and 112 based on the amount of current being supplied by the batteries of the first and second vehicles 106 and 112 for the functioning of the first and second vehicles 106 and 112.

At 904, the second prediction model 302 is trained based on the collected sensor data. The application server 114 may be configured to train the second prediction model 302 based on the collected sensor data. The trained second prediction model 302 may be validated by the application server 114 for improving the accuracy level of the second prediction model 302.

Figure 10A:
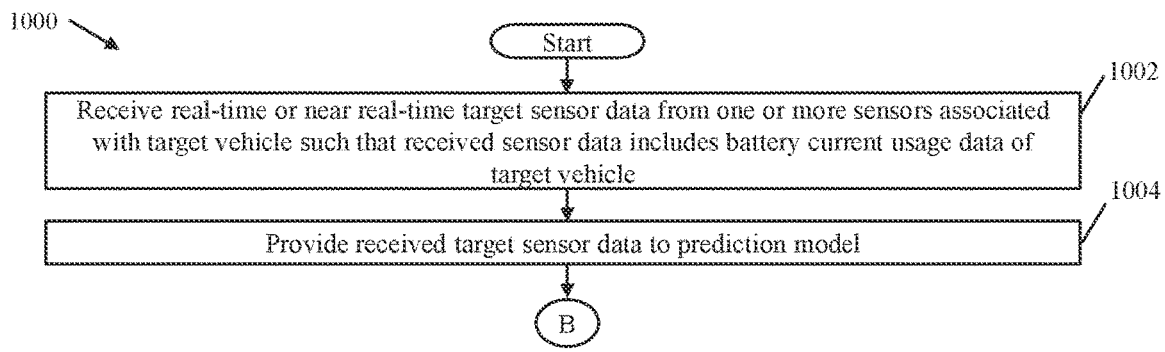
FIGS. 10A and 10B collectively, represent a flow chart that illustrates a method for augmenting transport services using real-time event detection, in accordance with an exemplary embodiment of the disclosure.
Figure 10B:
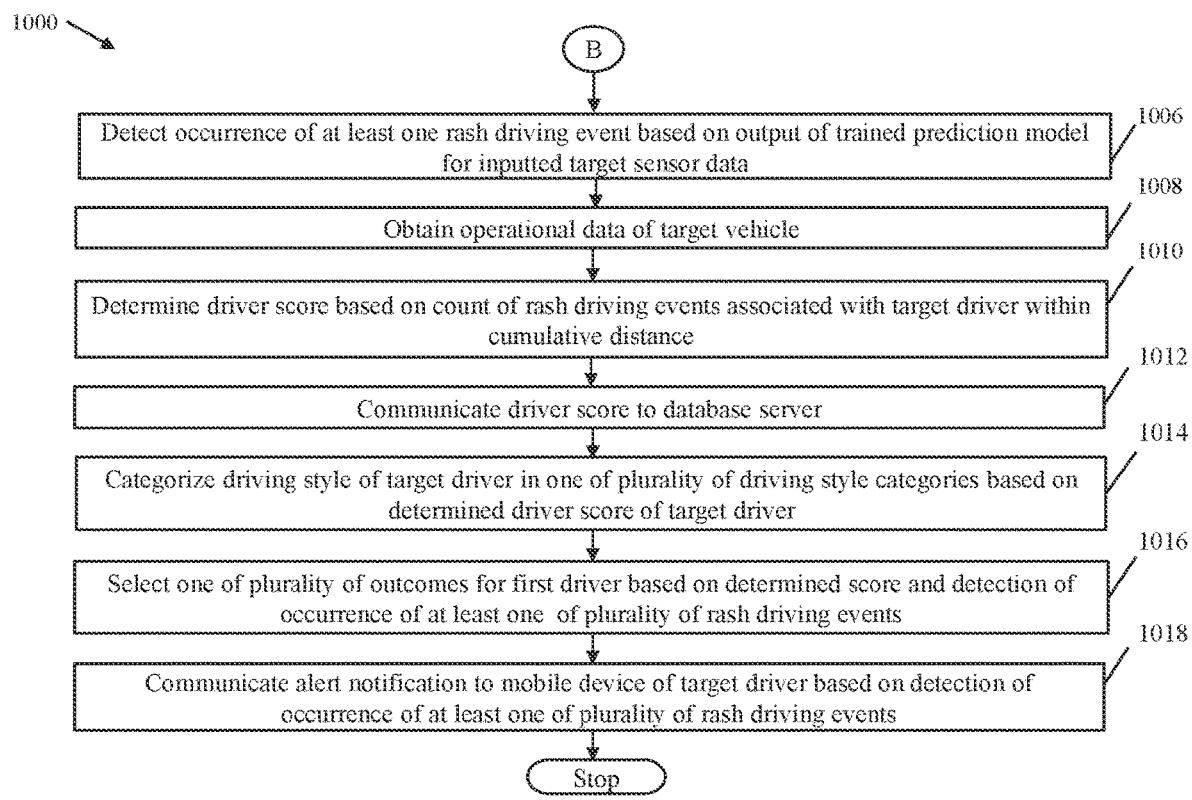

FIGS. 10A and 10B collectively, represent a flow chart 1000 for augmenting transport services using real-time event detection, in accordance with an embodiment of the present disclosure.

At 1002, real-time or near real-time target sensor data generated by sensors associated with the target vehicle 122 is received. The application server 114 may be configured to receive the target sensor data generated by the sensors associated with the target vehicle 122 in real-time or near real-time. The sensors associated with the target vehicle 122 may be included in the BMS of the target vehicle 122. The target sensor data may include battery current usage data of the target vehicle 122 at the first time-instance. The battery current usage data of the target vehicle 122 indicates the amount of current being supplied by the battery of the target vehicle 122 for the functioning of the target vehicle 122.

At 1004, the received target sensor data is provided as input to the trained second prediction model 302. At 1006, an occurrence of one of the plurality of rash driving events at the first time-instance is detected based on the output of the trained second prediction model 302 for the inputted target sensor data. The application server 114 may be configured to detect the occurrence of one of the plurality of rash driving events at the first time-instance based on the output of the trained second prediction model 302.

At 1008, the operational data of the target vehicle 122 is obtained. The application server 114 may be configured to obtain the operational data of the target vehicle 122 and one or more other vehicles that were driven by the target driver 118 in the past. The operational data is indicative of the cumulative distance that the target vehicle 122 and the one or more other vehicles are driven by the target driver 118 until the first time-instance.

At 1010, the driver score of the target driver 118 is determined based on the count of rash driving events associated with the target driver 118 within the cumulative distance. The application server 114 may be configured to determine the driver score of the target driver 118 based on the count of rash driving events associated with the target driver 118 within the cumulative distance.

At 1012, the determined driver score is communicated to the database server 116. The application server 114 may be configured to communicate the determined driver score to the database server 116. As 1014, the driving style and behavior of the target driver 118 is categorized in one of the plurality of driving style categories based on the determined driver score. The application server 114 may be configured to categorize the driving style and behavior of the target driver 118 in one of the plurality of driving style categories, e.g., the good driving style category and the bad driving style category. At 1016, one of the plurality of outcomes for the target driver 118 is selected based on the determined driver score and the detection of the occurrence of rash driving event. The application server 114 may be configured to select one of the plurality of outcomes for the target driver 118 based on the determined driver score and the detection of the occurrence of rash driving event. The plurality of outcomes may include incentivizing the target driver 118 for a high driver score and penalizing the target driver 118 for a low driver score. At 1018, an alert notification is communicated to the third communication device 120 of the target driver 118 based on the detection of the occurrence of the rash driving event at the current time instance. The application server 114 may be configured to communicate the alert notification to the third communication device 120 of the target driver 118 when the determined driver score of the target driver 118 is below a threshold driving score, i.e., when the driving style and behavior of the target driver 118 is categorized as in the bad driving style category.

Figure 11:
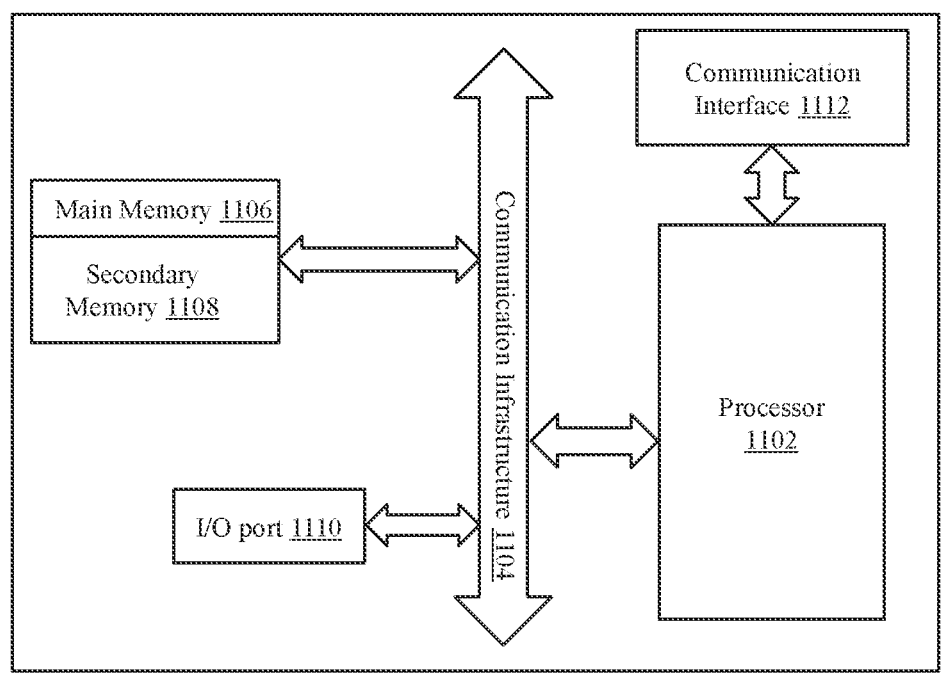
FIG. 11 is a block diagram that illustrates a system architecture of a computer system for augmenting transport services using real-time event detection, in accordance with an exemplary embodiment of the disclosure.

FIG. 11 is a block diagram that illustrates a system architecture of a computer system for augmenting transport services using real-time event detection, in accordance with an exemplary embodiment of the disclosure. An embodiment of the disclosure, or portions thereof, may be implemented as computer readable code on the computer system 1100. In one example, the application server 114 and the database server 116 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6A-6B, 7A-7B, 8, 9, and 10A-10B.

The computer system 1100 may include a processor 1102 that may be a special purpose or a general-purpose processing device. The processor 1102 may be a single processor or multiple processors. The processor 1102 may have one or more processor "cores." Further, the processor 1102 may be coupled to a communication infrastructure 1104, such as a bus, a bridge, a message queue, the communication network 124, multi-core message-passing scheme, or the like. The computer system 1100 may further include a main memory 1106 and a secondary memory 1108. Examples of the main memory 1106 may include RAM, ROM, and the like. The secondary memory 1108 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 1100 may further include an input/output (I/O) port 1110 and a communication interface 1112. The I/O port 1110 may include various input and output devices that are configured to communicate with the processor 1102. Examples of the input devices may include a keyboard, a mouse, a joystick, a touchscreen, a microphone, and the like. Examples of the output devices may include a display screen, a speaker, headphones, and the like. The communication interface 1112 may be configured to allow data to be transferred between the computer system 1100 and various devices that are communicatively coupled to the computer system 1100. Examples of the communication interface 1112 may include a modem, a network interface, i.e., an Ethernet card, a communication port, and the like. Data transferred via the communication interface 1112 may be signals, such as electronic, electromagnetic, optical, or other signals as will be apparent to a person skilled in the art. The signals may travel via a communications channel, such as the communication network 124, which may be configured to transmit the signals to the various devices that are communicatively coupled to the computer system 1100. Examples of the communication channel may include a wired, wireless, and/or optical medium such as cable, fiber optics, a phone line, a cellular phone link, a radio frequency link, and the like. The main memory 1106 and the secondary memory 1108 may refer to non-transitory computer readable mediums that may provide data that enables the computer system 1100 to implement the methods illustrated in FIGS. 6A-6B, 7A-7B, 8, 9 and 10A-10B.

Various embodiments of the disclosure provide the application server 114 for augmenting transport services using event detection. The application server 114 may be configured to collect the first sensor data generated by a plurality of sensors associated with a plurality of vehicles (e.g., the vehicles 106 and 112). The first sensor data includes the first plurality of sensor outputs that indicate the plurality of rash driving events. The application server 114 may be further configured to augment the first plurality of sensor outputs based on angular rotation to obtain the plurality of augmented sensor outputs. The application server 114 may be further configured to train the first prediction model 126 based on the plurality of augmented sensor outputs. The application server 114 may be further configured to receive, in real-time or near real-time, the target sensor data generated by one or more sensors associated with the target vehicle 122. The target sensor data includes the second plurality of sensor outputs that indicate a driving pattern of the target driver 118 driving the target vehicle 122 at the first time-instance. The application server 114 may be further configured to provide the target sensor data to the trained prediction model 126 as an input and detect an occurrence of at least one of the plurality of rash driving events at the first time-instance based on an output of the trained prediction model 126 for the inputted target sensor data.

Various embodiments of the disclosure provide the application server 114 for augmenting transport services using event detection. The application server 114 may be configured to collect the sensor data generated by a plurality of sensors associated with a plurality of vehicles (e.g., the vehicles 106 and 112). The collected sensor data includes at least first battery current usage data associated with the plurality of rash driving events. The application server 114 may be further configured to train the second prediction model 302 based on the collected sensor data. The application server 114 may be further configured to receive, in real-time or near real-time, the target sensor data generated by one or more sensors associated with the target vehicle 122. The target sensor data includes the second battery current usage data of the target vehicle 122 at the first time-instance. The application server 114 may be further configured to provide the target sensor data to the trained prediction model 302 as an input and detect an occurrence of at least one of the plurality of rash driving events at the first time-instance based on an output of the trained prediction model 302 for the inputted target sensor data.

Various embodiments of the disclosure provide a non-transitory computer-readable medium having stored thereon, computer executable instructions, which when executed by a computer, cause the computer to execute operations for augmenting transport services using event detection. The operations include collecting, by the application server 114, the first sensor data generated by the plurality of sensors associated with a plurality of vehicles (e.g., the vehicles 106 and 112). The first sensor data includes the first plurality of sensor outputs that indicate the plurality of rash driving events. The operations further include augmenting, by the application server 114, the first plurality of sensor outputs based on angular rotation to obtain the plurality of augmented sensor outputs. The operations further include training, by the application server 114, the prediction model 126 based on the plurality of augmented sensor outputs. The operations further include receiving, by the application server 114, in real-time or near real-time, the target sensor data generated by one or more sensors associated with the target vehicle 122. The target sensor data includes the second plurality of sensor outputs that indicate a driving pattern of the target driver 118 driving the target vehicle 122 at the first time-instance. The operations further include providing, by the application server 114, the target sensor data to the trained prediction model 126 as an input. The operations further include detecting, by the application server 114, an occurrence of at least one of the plurality of rash driving events at the first time-instance based on an output of the trained prediction model 126 for the inputted target sensor data.

Various embodiments of the disclosure provide a non-transitory computer-readable medium having stored thereon, computer executable instructions, which when executed by a computer, cause the computer to execute operations for augmenting transport services using event detection. The operations include collecting, by the application server 114, the sensor data generated by the plurality of sensors associated with a plurality of vehicles (e.g., the vehicles 106 and 112). The collected sensor data includes the first battery current usage data associated with the plurality of rash driving events. The operations further include training, by the application server 114, the prediction model 302 based on the collected sensor data. The operations further include receiving, by the application server 114, in real-time or near real-time, the target sensor data generated by one or more sensors associated with the target vehicle 122. The target sensor data includes the second battery current usage data of the target vehicle 122 at the first time-instance. The operations further include providing, by the application server 114, the target sensor data to the trained prediction model 302 as an input. The operations further include detecting, by the application server 114, an occurrence of at least one of the plurality of rash driving events at the first time-instance based on an output of the trained prediction model 302 for the inputted target sensor data.

Technological improvements in the application server 114 enable the application server 114 to detect occurrences of rash driving events on real-time or near real-time basis. The application server 114 leverages the sensor data generated by various sensors of a mobile device that is present inside the vehicle to detect a rash driving event for a vehicle. In other words, sensor data generated by a smartphone or a mobile phone of a driver may be utilized to detect any rash driving event caused by the driver. Thus, the application server 114 eliminates the requirement of equipping the vehicle with expensive specialized hardware. Further, the training of the first prediction model 126 is generalized to compensate for any angular orientation of the mobile device. Thus, the position or angular orientation of the mobile device generating sensor data does not affect the accuracy of the first prediction model 126. Further, the application server 114 skips event detection for those time instances when the mobile device generating the sensor data is unstable, thereby reducing the likelihood of false positive event detection. Thus, the method and system of the present disclosure enable rash driving event detection for all types of vehicles. Further, based on the rash driving event detection, drivers are categorized and real time alerts and warnings are communicated to the drivers. Such real time alerts and warnings enable reshaping of substandard driving styles to optimal driving styles. Thus, the methods and systems of the present disclosure are not only capable of detecting rash driving events but also correcting substandard driving styles of drivers on real-time or near real-time basis. Due to improvement in driving styles of drivers, transport services offered by a transport service aggregator are augmented and travel experience of the passengers is improved.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for augmenting transport services using real-time event detection. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method, comprising:
   collecting, by an application server, first sensor data generated by a plurality of sensors associated with a plurality of vehicles, wherein the first sensor data includes a first plurality of sensor outputs that indicate a plurality of rash driving events;
   augmenting, by the application server, the first plurality of sensor outputs based on angular rotation to obtain a plurality of augmented sensor outputs;
   training, by the application server, a prediction model based on the plurality of augmented sensor outputs;
   receiving, by the application server, in real-time or near real-time, target sensor data generated by one or more sensors associated with a target vehicle, wherein the target sensor data includes a second plurality of sensor outputs that indicate a first driving pattern of a target driver driving the target vehicle at a first time-instance;
   providing, by the application server, the target sensor data to the trained prediction model as an input; and
   detecting, by the application server, an occurrence of at least one of the plurality of rash driving events at the first time-instance based on an output of the trained prediction model for the inputted target sensor data.

2. The method of claim 1, wherein the first sensor data and the target sensor data include at least one of acceleration data, gravity sensor data, gyroscopic data, and magnetometer data.

3. The method of claim 1, wherein the plurality of rash driving events include at least one of a harsh braking event, a harsh cornering event, a harsh acceleration event, a harsh bump event, a tailgating event, and an over-speeding event.

4. The method of claim 1, wherein each sensor output of the first sensor data and each sensor output of the target sensor data includes three axes sensor values along first through third axis, respectively.

5. The method of claim 4, wherein augmenting the first plurality of sensor outputs comprises:
   generating, by the application server, a 3-dimensional (3D) rotation matrix for random angular rotation along the first through third axis; and
   applying, by the application server, the 3D rotation matrix to the first plurality of sensor outputs for the angular rotation of the first plurality of sensor outputs, wherein the first plurality of sensor outputs after the angular rotation correspond to the plurality of augmented sensor outputs.

6. The method of claim 1, wherein the one or more sensors associated with the target vehicle are included in a mobile device that is present inside the target vehicle while the target vehicle is driven by the target driver.

7. The method of claim 6, further comprising detecting, by the application server, whether the mobile device is stable or unstable based on the target sensor data, wherein the target sensor data is provided to the trained prediction model based on the detection that the mobile device is stable.

8. The method of claim 1, further comprising:
   determining, by the application server, a count of rash driving events associated with the target driver until the first time-instance, wherein the count of rash driving events is determined based on an aggregation of the detected rash driving event at the first time-instance and one or more rash driving events associated with the target driver in the past;
   obtaining, by the application server, operational data of the target vehicle and one or more other vehicles driven by the target driver in the past, wherein the operational data indicates a cumulative distance that the target vehicle and the one or more other vehicles are driven by the target driver until the first time-instance; and
   determining, by the application server, a driver score for the target driver based on at least the determined count of rash driving events within the cumulative distance.

9. The method of claim 8, further comprising selecting, by the application server, one of a plurality of outcomes for the target driver based on the determined driver score and the detection of the occurrence of at least one of the plurality of rash driving events, wherein the plurality of outcomes include at least incentivizing the target driver and penalizing the target driver.

10. The method of claim 8, further comprising categorizing, by the application server, a driving style of the target driver in one of a plurality of driving style categories based on the determined driver score of the target driver.

11. The method of claim 8, further comprising communicating, by the application server, an alert notification to a communication device of the target driver based on the detection of the occurrence of at least one of the plurality of rash driving events, wherein the alert notification is communicated when the driver score of the target driver is below a threshold driving score.

12. The method of claim 1, further comprising:
generating, by the application server, a driving-pattern profile of the target driver based on at least the received target sensor data;
receiving, by the application server, third sensor data from the one or more sensors associated with the target vehicle, wherein the third sensor data includes a third plurality of sensor outputs that indicate a second driving pattern; and
identifying, by the application server, whether the target vehicle is driven by the target driver or an unauthorized driver based on a comparison of the generated driving-pattern profile and the second driving pattern indicated by the third sensor data.

13. A system, comprising:
an application server configured to:
collect first sensor data from a plurality of sensors associated with a plurality of vehicles, wherein the first sensor data includes a first plurality of sensor outputs that indicate a plurality of rash driving events;
augment the first plurality of sensor outputs based on angular rotation to obtain a plurality of augmented sensor outputs;
train a prediction model based on the plurality of augmented sensor outputs;
receive, in real-time or near real-time, target sensor data from one or more sensors associated with a target vehicle, wherein the target sensor data includes a second plurality of sensor outputs that indicate a driving pattern of a target driver of the target vehicle at a first time-instance;
provide the target sensor data to the trained prediction model as an input;
detect an occurrence of at least one of the plurality of rash driving events at the first time-instance based on an output of the trained prediction model for the inputted target sensor data;
determine a count of rash driving events associated with the target driver of the target vehicle by the first time-instance, wherein the count of rash driving events is determined based on an aggregation of the detected rash driving event at the first time-instance and one or more rash driving events associated with the driver in the past;
receive operational data of the target vehicle and one or more other vehicles driven by the target driver in the past, wherein the operational data indicates a cumulative distance that the target vehicle and the one or more other vehicles are driven by the target driver until the first time-instance;
determine a driver score for the target driver based on at least the determined count of rash driving events within the cumulative distance; and
categorize a driving style of the target driver in one of a plurality of driving style categories based on the determined driver score of the target driver.

14. The system of claim 13, wherein each sensor output of the first sensor data and each sensor output of the target sensor data includes three axes sensor values along first through third axis, respectively, and wherein to augment the first plurality of sensor outputs, the application server is further configured to:
generate a 3-dimensional (3D) rotation matrix for random angular rotation along the first through third axis; and
apply the 3D rotation matrix to the first plurality of sensor outputs for the angular rotation of the first plurality of sensor outputs, wherein the first plurality of sensor outputs after the angular rotation correspond to the plurality of augmented sensor outputs.

15. The system of claim 13, wherein the one or more sensors associated with the target vehicle are included in a mobile device that is present inside the target vehicle, and wherein the application server is further configured to:
detect whether the mobile device is stable or unstable based on the target sensor data, wherein the target sensor data is provided to the trained prediction model based on the detection that the mobile device is stable.

16. The system of claim 13, wherein the application server is further configured to select one of a plurality of outcomes for the target driver based on the determined driver score and the detection of the occurrence of at least one of the plurality of rash driving events, and wherein the plurality of outcomes include at least incentivizing the target driver and penalizing the target driver.

17. The system of claim 16, wherein the application server is further configured to communicate an alert notification to a communication device of the target driver based on the detection of the occurrence of at least one of the plurality of rash driving events, and wherein the alert notification is communicated when the driver score of the target driver is above a threshold driving score.

18. The system of claim 13, wherein the plurality of rash driving events include at least one of a harsh braking event, a harsh cornering event, a harsh acceleration event, a harsh bump event, a tailgating event, and an over-speeding event.

19. A method, comprising:
collecting, by an application server, sensor data generated by a plurality of sensors associated with a plurality of vehicles, wherein the collected sensor data includes at least first battery current usage data associated with a plurality of rash driving events;
training, by the application server, a prediction model based on the collected sensor data;
receiving, by the application server, in real-time or near real-time, target sensor data generated by one or more sensors associated with a target vehicle, wherein the target sensor data includes second battery current usage data of the target vehicle at a first time-instance;
providing, by the application server, the target sensor data to the trained prediction model as an input; and
detecting, by the application server, an occurrence of at least one of the plurality of rash driving events at the first time-instance based on an output of the trained prediction model for the inputted target sensor data.

* * * * *